United States Patent
Noro et al.

(10) Patent No.: US 8,017,242 B2
(45) Date of Patent: *Sep. 13, 2011

(54) ANTIREFLECTION FILM, POLARIZING PLATE AND IMAGE DISPLAY

(75) Inventors: Masaki Noro, Minami-Ashigara (JP);
Hiroyuki Yoneyama, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 927 days.

This patent is subject to a terminal disclaimer.

(21) Appl. No.: 11/994,313

(22) PCT Filed: Sep. 28, 2006

(86) PCT No.: PCT/JP2006/320000
§ 371 (c)(1),
(2), (4) Date: Dec. 28, 2007

(87) PCT Pub. No.: WO2007/037525
PCT Pub. Date: Apr. 5, 2007

(65) Prior Publication Data
US 2009/0087668 A1    Apr. 2, 2009

(30) Foreign Application Priority Data
Sep. 28, 2005  (JP) .................... P2005-281584

(51) Int. Cl.
B32B 27/18  (2006.01)
B32B 27/26  (2006.01)
B32B 27/28  (2006.01)

(52) U.S. Cl. ........................ 428/421; 420/447
(58) Field of Classification Search ............... None
See application file for complete search history.

(56) References Cited

U.S. PATENT DOCUMENTS

| | | |
|---|---|---|
| 2003/0027078 A1 | 2/2003 | Kang et al. |
| 2003/0120008 A1 | 6/2003 | Obayashi et al. |
| 2007/0042173 A1* | 2/2007 | Nagaoka et al. ......... 428/313.9 |

FOREIGN PATENT DOCUMENTS

| | | |
|---|---|---|
| EP | 1 491 562 A1 | 12/2004 |
| JP | 62-174276 A | 7/1987 |
| JP | 1-259071 A | 10/1989 |
| JP | 2-173172 A | 7/1990 |
| JP | 2-302477 A | 12/1990 |
| JP | 10-3001 A | 1/1998 |
| JP | 11-228631 A | 8/1999 |
| JP | 2003-36732 A | 2/2003 |

* cited by examiner

Primary Examiner — Ramsey Zacharia
(74) Attorney, Agent, or Firm — Birch, Stewart, Kolasch & Birch, LLP

(57) ABSTRACT

An antireflection film is provided and includes: a transparent support; and a low refractive index layer formed by coating a composition on the transparent support. The composition contains a fluorine-containing polymer containing a fluorine-containing vinyl monomer polymerization unit and a hydroxyl group-containing vinyl monomer polymerization unit, a crosslinking agent capable of reacting with a hydroxyl group, and a salt formed from an acid and an organic base, the organic base having a pKa of a conjugate acid thereof of 5.0 to 13.0.

10 Claims, 1 Drawing Sheet

ANTIREFLECTION FILM, POLARIZING PLATE AND IMAGE DISPLAY

TECHNICAL FIELD

The present invention relates to an antireflection film, a polarizing plate using the antireflection film, and an image display using the antireflection film or the polarizing plate in an outermost surface of the display.

BACKGROUND ART

Antireflection films are generally arranged in the outermost surface of displays in image displays such as cathode ray tube (CRT), plasma display (PDP), electroluminescence display (ELD), and liquid crystal display (LCD) so as to reduce reflectance by utilizing the principle of optical interference for the purpose of preventing contrast reduction and mirroring of images by the reflection of outer light.

These antireflection films can be manufactured by forming on a support a low refractive index layer having a refractive index lower than that of the support and of an appropriate thickness. From the viewpoint of realizing low reflectance, materials having the lowest possible refractive index are desired for a low refractive index layer. Since an antireflection film is used on the outermost surface of a display, the film is required to have high scratch resistance. For realizing high scratch resistance in a thin film of a thickness of 100 nm or so, the strength of the film itself and adhesion property to the lower layer are required.

For reducing the refractive index of materials, means of (1) introducing a fluorine atom, and (2) reducing the density (introduction of voids) are used, but film strength and interfacial adhesion decrease and scratch resistance lowers in both of these means, so that the compatibility of low refractive index with high scratch resistance has been a difficult problem. It is important to sufficiently advance curing reaction to realize high scratch resistance. From the viewpoint of productivity, it is advantageous to coat a fluorine-containing polymer on a support and then cure the coated film by any means. Methods of reacting the hydroxyl group of a fluorine-containing polymer and a curing agent with an acid catalyst to cure the low refractive index layer of an antireflection film are disclosed in JP-A-11-228631, JP-A-2003-36732 and JP-A-2004-307524.

On the other hand, curable compositions and coatings using amine salts of sulfonic acids as the catalysts are proposed in JP-A-62-174276, JP-A-1-259071, JP-A-2-173172 and JP-A-2-302477.

In the techniques of JP-A-11-228631, JP-A-2003-36732 and JP-A-2004-307524, sulfonic acids and carboxylic acids are used as the acid catalysts. Curing activity is certainly high according to these techniques, but a curing reaction partly proceeds during preservation, so that the stability of the coating solution is insufficient and coating conditions are limited. Therefore, the compatibility of curing activity and the stability of a coating solution has been desired.

DISCLOSURE OF THE INVENTION

An object of an illustrative, non-limiting embodiment of the present invention is to provide an antireflection film excellent in scratch resistance while reconciling the preservation stability of a coating solution and curing activity. Another object of an illustrative, non-limiting embodiment of the present invention is to provide a polarizing plate and an image display using the antireflection film.

The present inventors have found as a result of earnest examination that a coating solution ensuring compatibility of preservation stability and curing activity and having high production aptitude could be manufactured by using, as an acid catalyst, a curing catalyst of a salt comprising an acid and an organic base having a conjugate base having a specific acid dissociation constant, as a result an antireflection film excellent in scratch resistance could be formed.

The invention can provide an antireflection film, a polarizing plate and an image display having the following constitutions, thus the above objects can be achieved.

(1) An antireflection film including: a transparent support; and a low refractive index layer formed by coating a composition on the transparent support, the composition comprising: a fluorine-containing polymer comprising a fluorine-containing vinyl monomeric polymerization unit (a first polymerization unit derived from a fluorine-containing vinyl monomer) and a hydroxyl group-containing vinyl monomeric polymerization unit (a second polymerization unit derived from a hydroxyl group-containing monomer); a crosslinking agent capable of reacting with a hydroxyl group; and a salt formed from an acid and an organic base, the organic base having a pKa of a conjugate acid thereof of 5.0 to 13.0.

(2) The antireflection film as described in the above (1), wherein the pKa is from 5.0 to 11.0.

(3) The antireflection film as described in the above (1) or (2), wherein the acid is a sulfonic acid or a phosphonic acid.

(4) The antireflection film as described in any one of the above (1) to (3), wherein the composition has the salt in a proportion of 0.01 to 10 mass % to the fluorine-containing polymer.

(5) The antireflection film according to any one of the above (1) to (4), wherein the fluorine-containing polymer further comprises a polymerization unit having a graft portion on a side chain thereof, the graft portion containing a polysiloxane repeating unit represented by formula (1), and the fluorine-containing polymer has a main chain consisting of carbon atoms:

Formula (1):

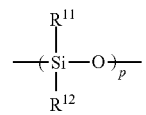

wherein $R^{11}$ and $R^{12}$ each independently represents an alkyl group or an aryl group; and p represents an integer of 5 to 500.

(6) The antireflection film as described in any one of the above (1) to (4), wherein the fluorine-containing polymer further has a main chain comprising a polysiloxane repeating unit represented by formula (1):

Formula (1):

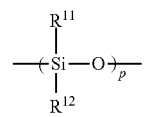

wherein $R^{11}$ and $R^{12}$ each independently represents an alkyl group or an aryl group; and p represents an integer of 5 to 500.

(7) The antireflection film as described in any one of the above (1) to (6), wherein the composition further comprises a compound having a polysiloxane structure, the polysiloxane structure having a hydroxyl group or a functional group capable of forming a bond by reaction with a hydroxyl group.

(8) The antireflection film as described in any one of the above (1) to (7), wherein the crosslinking agent is a compound comprising a nitrogen atom and two or more carbon atoms adjacent to nitrogen atom, each being substituted with an alkoxyl group.

(9) A polarizing plate comprising: a polarizer; and two protective films, at least one of the two protective films being an antireflection film as described in any one of the above (1) to (8).

(10) An image display comprising an antireflection film as described in any one of the above (1) to (8) or a polarizing plate as described in the above (9) in an outermost surface of the image display.

DETAILED DESCRIPTION OF THE INVENTION

Although the invention will be described below with reference to the exemplary embodiments thereof, the following exemplary embodiments and modifications do not restrict the invention.

According to an exemplary embodiment of the invention, an antireflection film is manufactured with a coating solution having compatibility of preservation stability and curing activity, accordingly production aptitude is high and which film shows excellent scratch resistance while maintaining sufficient antireflection property. In addition, an image display provided with the antireflection film and an image display equipped with a polarizing plate using the antireflection film are little in mirroring of outer light and background and extremely high in visibility.

Exemplary embodiments of the invention will be described in greater detail below. In the specification of the invention, when numerical values represent physical values and characteristic values, the description "from (numerical value 1) to (numerical value 2)" means "(numerical value 1) or more and (numerical value 2) or less". Further, "on a support" includes both of a case of meaning the direct surface of the support and a case of the surface of the support having been provided with any layer (film).

<Antireflection Film>
(Fundamental Constitution of Antireflection Film)

As an embodiment of the invention, the fundamental constitution of an exemplary antireflection film is explained with referring to the accompanying drawing.

Figure 1A:
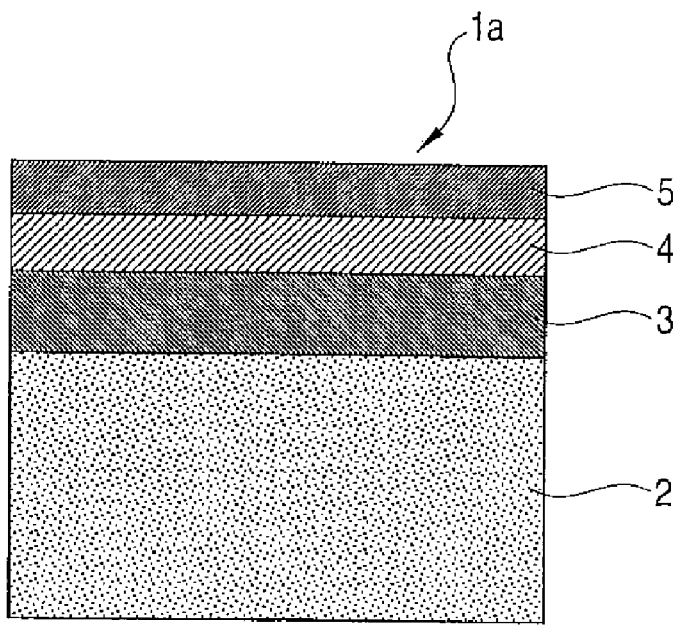
FIG. 1A is a cross-sectional view showing an exemplary embodiment in an antireflection film of the invention.

A cross-sectional view typically shown in FIG. 1A is an example of an antireflection film of the invention. An antireflection film $1a$ has a layer constitution in order of a transparent support 2, a hard coat layer 3, an antiglare hard coat layer 4, and a low refractive index layer 5.

Matting particles are dispersed in the antiglare hard coat layer 4 (not shown), and the refractive index of the material of the antiglare hard coat layer 4 other than the area of the matting particles is preferably in the range of from 1.48 to 2.00, and more preferably from 1.50 to 1.80. Further, the refractive index of low refractive index layer 5 is preferably in the range of from 1.20 to 1.47, and more preferably from 1.30 to 1.44.

The hard coat layer in the invention may be a hard coat layer having an antiglare property as above, or may be a hard coat layer not having an antiglare property, and the hard coat layer may comprise a single layer, or a plurality of layers, e.g., may include from two to four layers. Further, the hard coat layer may not be present. Accordingly, the hard coat layer 3 and the antiglare hard coat layer 4 as shown in FIG. 1 are not essential, but it is preferred that either of these hard coat layers is coated for the purpose of imparting film strength. The low refractive index layer is coated as the outermost layer.

Figure 1B:
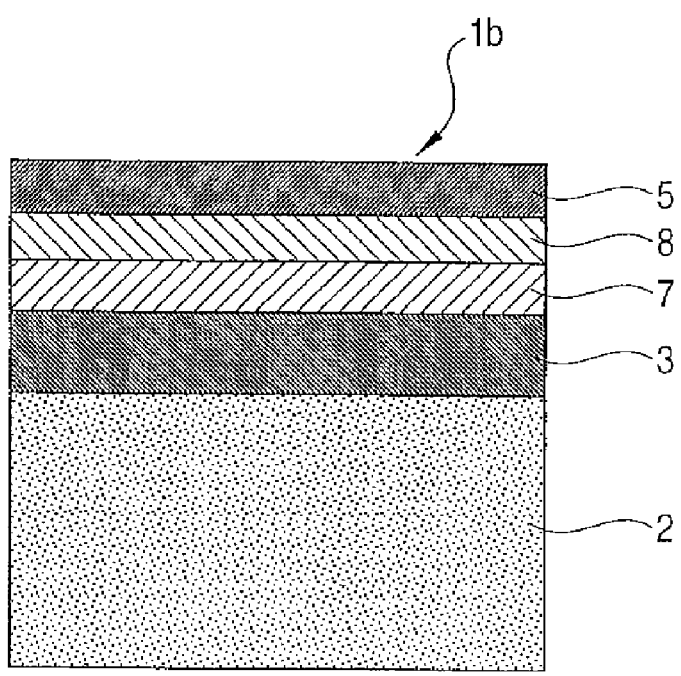
FIG. 1B is a cross-sectional view showing another exemplary embodiment in an antireflection film of the invention.

The cross-sectional view typically shown in FIG. 1B is an example of an antireflection film of the invention. A antireflection film $1b$ has a layer constitution in order of a transparent support 2, a hard coat layer 3, a middle refractive index layer 7, a high refractive index layer 8, and a low refractive index layer (outermost layer) 5. The transparent support 2, the middle refractive index layer 7, the high refractive index layer 8, and the low refractive index layer 5 have refractive indexes satisfying the following relationship:

Refractive index of high refractive index layer>refractive index of middle refractive index layer>refractive index of transparent support>refractive index of low refractive index layer In the layer constitution as shown in FIG. 1B, as disclosed in JP-A-59-50601, it is preferred for the middle refractive index layer, high refractive index layer, and low refractive index layer to satisfy the following expressions (1), (2) and (3) respectively for obtaining an antireflection film having more excellent antireflection performance.

$$(h\lambda/4)\times 0.7 < n_1 d_1 < (h\lambda/4)\times 1.3 \qquad (1)$$

$$(i\lambda/4)\times 0.7 < n_2 d_2 < (i\lambda/4)\times 1.3 \qquad (2)$$

$$(j\lambda/4)\times 0.7 < n_3 d_3 < (j\lambda/4)\times 1.3 \qquad (3)$$

In expressions (1) to (3), h is a positive integer (generally 1, 2 or 3), i is a positive integer (generally 1, 2 or 3), and j is a positive odd number (generally 1). $n_1$, $n_2$ and $n_3$ are respectively refractive indexes of the middle refractive index layer, high refractive index layer, and low refractive index layer, and $d_1$, $d_2$ and $d_3$ are respectively layer thickness (nm) of the middle refractive index layer, high refractive index layer, and low refractive index layer. Here, $\lambda$ is design wavelength to reduce the reflectance. When an antireflection film is used on the surface of an ordinary display, $\lambda$ is the wavelength of visible ray (nm) in the range of from 380 to 680 nm. By setting $\lambda$ in the range of from 500 to 550 nm where human eyes have particularly high visibility, an antireflection film low in luminous reflectance can be designed.

In the layer constitution as shown in FIG. 1B, it is especially preferred for the middle refractive index layer, high refractive index layer, and low refractive index layer to satisfy respectively the following expressions (1-1), (2-1) and (3-1). Here, $\lambda$ is 500 nm, h is 1, i is 2, and j is 1.

$$(h\lambda/4)\times 0.80 < n_1 d_1 < (h\lambda/4)\times 1.00 \qquad (1\text{-}1)$$

$$(i\lambda/4)\times 0.75 < n_2 d_2 < (i\lambda/4)\times 0.95 \qquad (2\text{-}1)$$

$$(j\lambda/4)\times 0.95 < n_3 d_3 < (j\lambda/4)\times 1.05 \qquad (3\text{-}1)$$

Here, a high refractive index, a middle refractive index and a low refractive index are the relative values of refractive indexes among the layers. In FIG. 1B, the high refractive index layer is used as the light interference layer and an antireflection film having extremely excellent antireflection performance can be manufactured.

(Low Refractive Index Layer)

In the next place, a low refractive index layer in the antireflection film of the invention is explained.

The refractive index of the low refractive index layer in the invention is preferably from 1.20 to 1.47, and more preferably from 1.30 to 1.44.

The thickness of the low refractive index layer in the invention is preferably from 50 to 400 nm, more preferably from 60 to 150 nm, and most preferably from 60 to 130 nm.

Further, it is preferred for the low refractive index layer to satisfy the following expression (3) in the point of the reduction of reflectance.

$$(j\lambda/4) \times 0.7 < n_3 d_3 < (j\lambda/4) \times 1.3 \quad (3)$$

In formula (3), j is a positive odd number, and $n_3$ and $d_3$ are respectively the refractive index and layer thickness (nm) of the low refractive index layer. Here, $\lambda$ is design wavelength to reduce the reflectance. By setting $\lambda$ in the range of from 500 to 550 nm where human eyes have high visibility, an antireflection film low in luminous reflectance can be designed.

Incidentally, to satisfy expression (3) means the presence of j (a positive odd number, generally 1) satisfying expression (3) in the above range of the wavelength.

The low refractive index layer in the invention can be formed from a composition containing: at least one kind of fluorine-containing polymer containing at least (a) a fluorine-containing vinyl monomer polymerization unit and at least (b) a hydroxyl group-containing vinyl monomer polymerization unit; at least one kind of crosslinking agent capable of reacting with a hydroxyl group; and at least one kind of salt formed from an acid and an organic base.

The fluorine-containing polymer is described in detail below.

(Fluorine-Containing Polymers)
Fluorine-containing Vinyl Monomer Polymerization Unit (a):

In the invention, the structure of fluorine-containing vinyl monomer polymerization unit (a) contained in a fluorine-containing polymer used for forming a low refractive index layer is not especially restricted. For instance, polymerization units based on fluorine-containing olefin, perfluoroalkyl vinyl ether, and vinyl ether and (meth)acrylate having a fluorine-containing alkyl group can be exemplified. From the production aptitude and properties required of the low refractive index layer, e.g., a refractive index and film strength, the fluorine-containing polymer is preferably a copolymer of fluorine-containing olefin and vinyl ether, and more preferably a copolymer of perfluoroolefin and vinyl ether. Further, for the purpose of reducing the refractive index, perfluoroalkyl vinyl ether, and vinyl ether and (meth)acrylate having a fluorine-containing alkyl group may be contained as the copolymerization components.

As the perfluoroolefin, those having from 3 to 7 carbon atoms are preferred. Perfluoropropylene or perfluorobutylene are preferred from the viewpoint of polymerization reactivity, and perfluoropropylene is especially preferred in the point of availability.

The content of perfluoroolefin in the polymer is preferably from 25 to 75 mol %. From the reduction of the refractive index of the material, it is desired to increase the introduction amount of perfluoroolefin, but introduction of from 50 to 70 mol % is the limit from polymerization reactivity in ordinary solution system radical polymerization reaction, and it is difficult to introduce more than this range. The content of perfluoroolefin in the invention is preferably from 30 to 70 mol %, more preferably from 30 to 60 mol %, still more preferably from 35 to 60 mol %, and especially preferably from 40 to 60 mol %.

The fluorine-containing polymer for use in the invention may be copolymerized with perfluorovinyl ether represented by the following formula (M2) for the reduction of the refractive index. The copolymer component may be introduced into the polymer in the range of from 0 to 40 mol %, preferably from 0 to 30 mol %, and more preferably from 0 to 20 mol %.

M2:

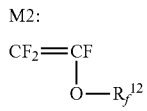

In formula (M2), $Rf^{12}$ represents a fluorine-containing alkyl group having from 1 to 30 carbon atoms, preferably from 1 to 20 carbon atoms, more preferably a fluorine-containing alkyl group having from 1 to 10 carbon atoms, and especially preferably a perfluoroalkyl group having from 1 to 10 carbon atoms. The fluorinated alkyl group may have a substituent. As the specific examples of $Rf^{12}$, —$CF_3$ (M2-(1)), —$CF_2CF_3$ (M2-(2)), —$CF_2CF_2CF_3$ (M2-(3)), and —$CF_2CF_2CF(OCF_2CF_2CF_3)CF_3$ (M2-(4)) are exemplified.

In the invention, for the reduction of the refractive index, fluorine-containing vinyl ether represented by the following formula (M1) may be copolymerized. The copolymer component may be introduced into the polymer in the range of from 0 to 40 mol %, preferably from 0 to 30 mol %, and especially preferably from 0 to 20 mol %.

M1:

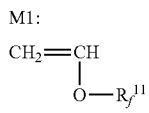

In formula (M1), $Rf^{11}$ represents a fluorine-containing alkyl group having from 1 to 30 carbon atoms, preferably from 1 to 20 carbon atoms, and especially preferably a fluorine-containing alkyl group having from 1 to 15 carbon atoms, and the fluorine-containing alkyl group may be straight chain (e.g., $CF_2CF_3$, —$CH_2(CF_2)_{q1}H$, —$CH_2CH_2(CF_2)_{q1}F$ (q1 is an integer of from 2 to 12), etc.), may have a branched structure (e.g., $CH(CF_3)_2$, $CH_2CF(CF_3)_2$, —$CH(CH_3)CF_2CF_3$, —$CH(CH_3)(CF_2)_5CF_2H$, etc.), may have an alicyclic structure (preferably a 5- or 6-membered ring, e.g., a perfluorocyclohexyl group, a perfluorocyclopentyl group, or an alkyl group substituted with these groups), or may have an ether bond (e.g., —$CH_2OCH_2CF_2CF_3$, —$CH_2CH_2OCH_2(CF_2)_{q2}H$, —$CH_2CH_2OCH_2(CF_2)_{q2}F$ (q2 is an integer of from 2 to 12), $CH_2CH_2OCF_2CF_2OCF_2CF_{21}H$, etc.). The substituents represented by Rf11 are not restricted to the substituents described here.

The monomers represented by formula (M1) can be synthesized by various methods, e.g., methods of reacting elimination group-substituted alkyl vinyl ethers such as vinyloxyalkyl sulfonate or vinyloxyalkyl chloride with fluorine-containing alcohol in the presence of a base catalyst as described in Macromolecules, Vol. 32 (21), p. 7122 (1999), JP-A-2-721; a method of mixing fluorine-containing alcohol and vinyl ethers, e.g., butyl vinyl ether in the presence of a palladium catalyst to perform vinyl group exchange as disclosed in WO 92/05135; and a method of reacting fluorine-containing ketone and dibromoethane in the presence of a potassium fluoride catalyst, and then performing dehydrogen bromide reaction with an alkali catalyst as disclosed in U.S. Pat. No. 3,420,793. Hydroxyl group-containing vinyl monomer polymerization unit (b):

The fluorine-containing polymer used in the invention contains hydroxyl group-containing vinyl monomer polymerization unit (b), but the content of the polymerization unit (b) is not particularly restricted. Since a hydroxyl group has a function of reacting with a crosslinking agent to be cured, the more the content of the hydroxyl groups, the harder is the film to be formed and preferred, and the content is preferably from 10 to 70 mol %, more preferably from 20 to 60 mol %, and still more preferably from 25 to 55 mol %.

Those copolymerizable with the fluorine-containing vinyl monomer polymerization units can be used as the hydroxyl group-containing vinyl monomer with no particular restriction, e.g., vinyl ethers, (meth)acrylates, styrenes, etc., can be used. For example, when perfluoroolefin (hexafluoropropylene, etc.) is used as the fluorine-containing vinyl monomer, it is preferred to use hydroxyl group-containing vinyl ethers having good copolymerizability, specifically 2-hydroxyethyl vinyl ether, 4-hydroxybutyl vinyl ether, 6-hydroxyhexyl vinyl ether, 8-hydroxyoctyl vinyl ether, diethylene glycol vinyl ether, triethylene glycol vinyl ether, 4-(hydroxymethyl)cyclohexyl-methyl vinyl ether are exemplified, but hydroxyl group-containing vinyl ethers are not restricted to these compounds.

Constitutional Unit (c) or (d) Having a Polysiloxane Structure:

For giving an antifouling property, it is also preferred that the fluorine-containing polymer in the invention has a constitutional unit having a polysiloxane structure. As fluorine-containing polymers having a polysiloxane structure useful in the invention, fluorine-containing polymers containing each at least one kind of (a) a fluorine-containing vinyl monomer polymerization unit, (b) a hydroxyl group-containing vinyl monomer polymerization unit, and (c) polymerization unit having a graft portion containing a polysiloxane repeating unit represented by the following formula (1) on the side chain of the polymer, and the main chain comprises carbon atoms alone, and fluorine-containing polymers containing each at least one kind of (a) a fluorine-containing vinyl monomer polymerization unit, (b) a hydroxyl group-containing vinyl monomer polymerization unit, and (d) a polysiloxane repeating unit represented by the following formula (1) on the main chain of the polymer are exemplified.

Formula (1):

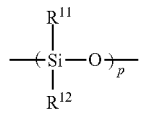

In formula (1), $R^{11}$ and $R^{12}$, which may be the same or different, each represents an alkyl group or an aryl group. The alkyl group preferably has from 1 to 4 carbon atoms, e.g., a methyl group, a trifluoromethyl group, and an ethyl group are exemplified. The aryl group preferably has from 6 to 20 carbon atoms, and a phenyl group and a naphthyl group are exemplified. Of these groups, a methyl group and a phenyl group are preferred, and a methyl group is especially preferred. p represents an integer of from 5 to 500, preferably from 8 to 350, and especially preferably from 10 to 250.

Polymerization Unit Having a Graft Portion Containing a Polysiloxane Repeating Unit on the Side Chain:

A polymer having a polysiloxane structure represented by formula (1) on the side chain can be synthesized with reference to J. Appl. Polym. Sci., Vol. 2000, p. 78 (1955), and JP-A-56-28219, e.g., a method of introducing to a polymer having a reactive group such as an epoxy group, a hydroxyl group, carboxyl, acid anhydride and the like, polysiloxane having an opposite reactive group (e.g., an amino group, a mercapto group, a carboxyl group, a hydroxyl group, etc., to an epoxy group, an acid anhydride group) on one terminal (e.g., SILAPLANE series (manufactured by Chisso Corporation), etc.) by polymer reaction, and a method of polymerization of a polysiloxane-containing silicon macromer, and both methods can be preferably used. The method of introducing by the polymerization of a silicon macromer is more preferred in the invention.

As silicon macromers, those having a polymerizable group capable of copolymerization with a fluorine-containing olefin are sufficient, and preferably compounds having a structure represented by any of the following formulae (2-1) to (2-4).

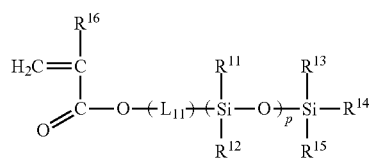

Formula (2-1)

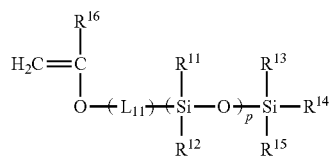

Formula (2-2)

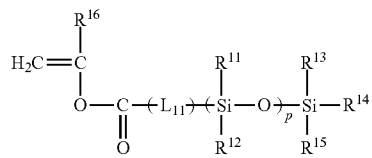

Formula (2-3)

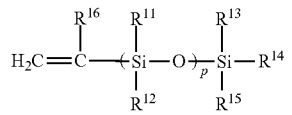

Formula (2-4)

In formulae (2-1) to (2-4), $R^{11}$, $R^{12}$ and p have the same meanings as those in formula (1), and the preferred ranges are also the same; $R^{13}$, $R^{14}$ and $R^{15}$ each represents a substituted or unsubstituted monovalent organic group, or a hydrogen atom, preferably an alkyl group having from 1 to 10 carbon atoms (e.g., a methyl group, an ethyl group, an octyl group, etc.), an alkoxyl group having from 1 to 10 carbon atoms (e.g., a methoxy group, an ethoxy group, a propyloxy group, etc.), or an aryl group having from 6 to 20 carbon atoms (e.g., a phenyl group, a naphthyl group, etc.), and especially preferably an alkyl group having from 1 to 5 carbon atoms; $R^{16}$ represents a hydrogen atom or a methyl group; and $L_{11}$ represents an arbitrary linking group having from 1 to 20 carbon atoms, e.g., a substituted or unsubstituted, straight chain, branched, or alicyclic alkylene group, a substituted or unsubstituted arylene group are exemplified, preferably an unsubstituted straight chain alkylene group having from 1 to 20 carbon atoms, and especially preferably an ethylene group or a propylene group. These compounds can be synthesized according to the method disclosed, e.g., in JP-A-6-322053.

Any of the compounds represented by formulae (2-1) to (2-4) can be preferably used in the invention, but of these compounds, the compounds having a structure represented by formula (2-1), (2-2) or (2-3) are preferred in the point of copolymerizability with a fluorine-containing olefin. The content of the polysiloxane portion in the graft copolymer is preferably from 0.01 to 20 mass %, more preferably from 0.05 to 15 mass %, and especially preferably from 0.5 to 10 mass %.

The examples of polymerization units having a polymer graft portion containing a polysiloxane portion on the side chain useful in the invention are shown below, but the invention is not restricted thereto.

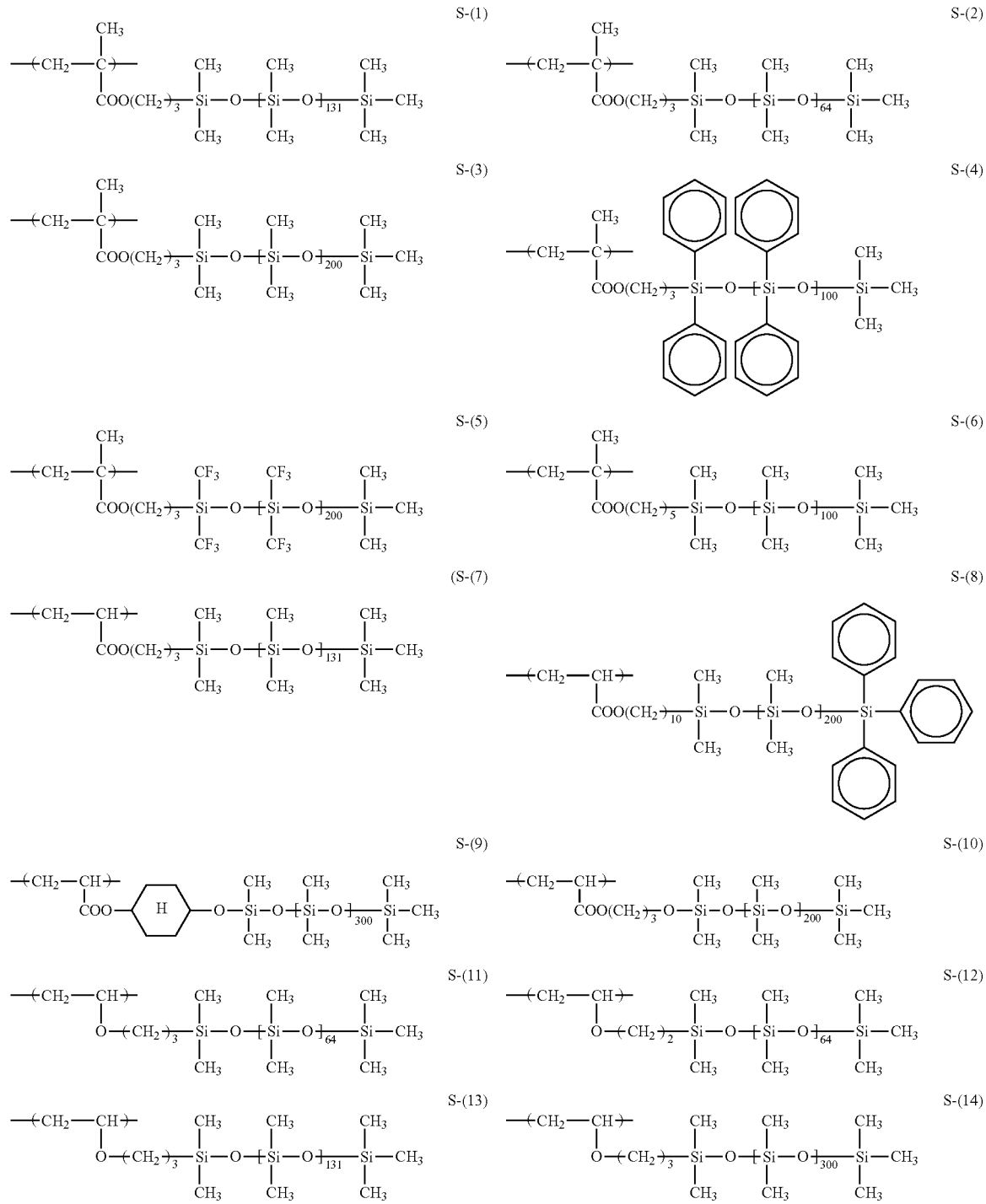

-continued
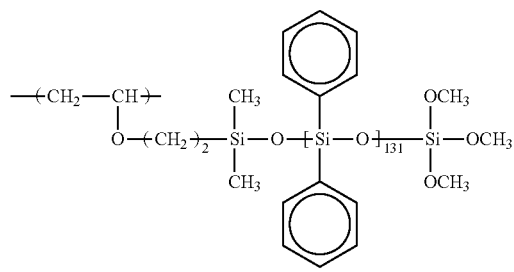 S-(15)
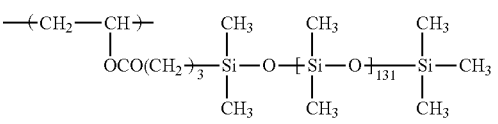 S-(16)
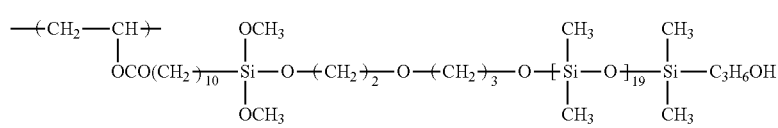 S-(17)
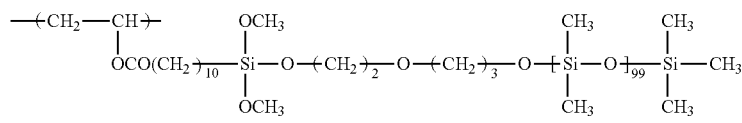 S-(18)
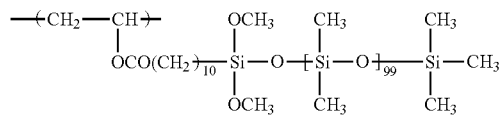 S-(19)
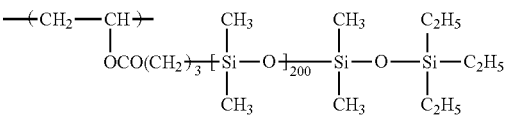 S-(20)
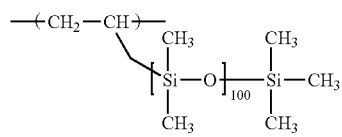 S-(21)
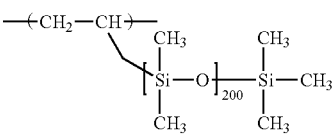 S-(22)
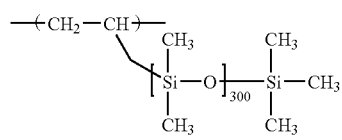 S-(23)
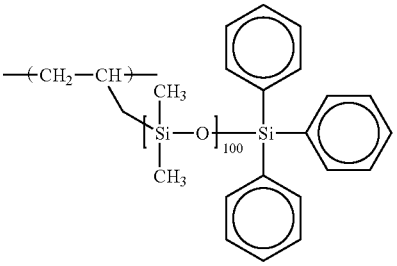 S-(24)
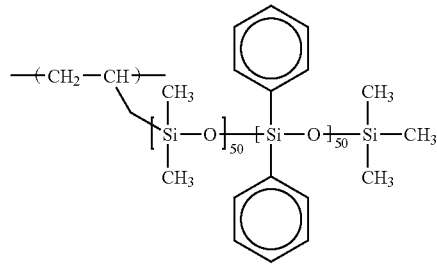 S-(25)
S-(26)
S-(27)
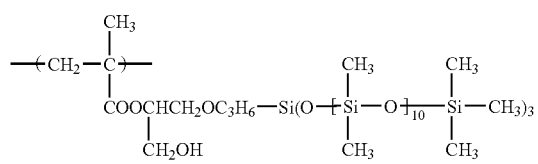
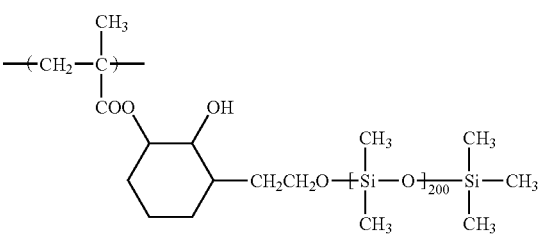 S-(28)

-continued

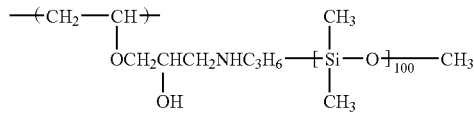
S-(29)

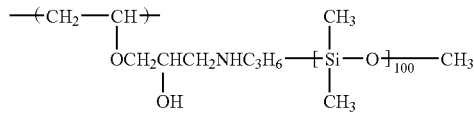
S-(30)

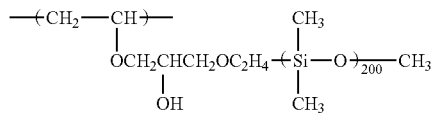
S-(31)

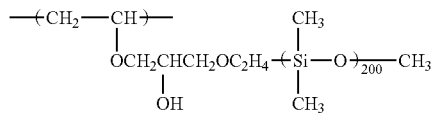
S-(32)

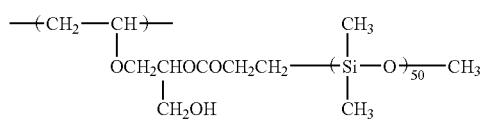
S-(33)

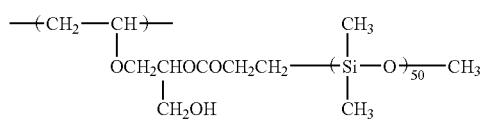

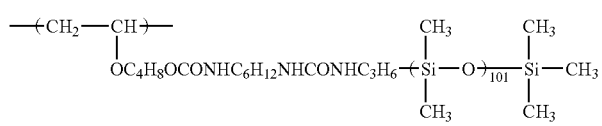
S-(34)

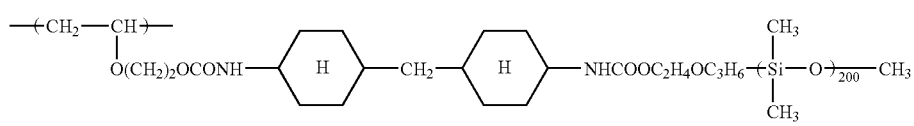
S-(35)

SILAPLANE FM-0711 (manufactured by Chisso Corporation)  S-(36)

SILAPLANE FM-0721 (manufactured by Chisso Corporation)  S-(37)

SILAPLANE FM-0725 (manufactured by Chisso Corporation)  S-(38)

Polysiloxane Repeating Unit Contained in Main Chain:

In the invention, in place of the fluorine-containing polymer containing a polysiloxane repeating unit on the side chain, a fluorine-containing polymer having a polysiloxane structure represented by formula (1) on the main chain, that is, a fluorine-containing polymer containing each at least one kind of (a) a fluorine-containing vinyl monomer polymerization unit, (b) a hydroxyl group-containing vinyl monomer polymerization unit, and (d) a polysiloxane repeating unit represented by the following formula (1) on the main chain can also be preferably used.

Formula (1):

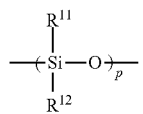

In formula (1), $R^{11}$, $R^{12}$ and p are the same as $R^{11}$, $R^{12}$ and p in formula (1) defined above in the fluorine-containing polymer containing a polysiloxane repeating unit on the side chain, and the preferred ranges are also the same.

The introducing method of a polysiloxane structure into the main chain is not especially restricted and, e.g., a method of using a polymer type initiator such as azo group-containing polysiloxaneamide as disclosed in JP-A-6-93100, a method of introducing a polymerization initiator and a reactive group derived from a chain transfer agent (e.g., a mercapto group, a carboxyl group, a hydroxyl group, etc.) to the terminal of a polymer, and then reacting with a polysiloxane containing one-terminal reactive group or both-terminal reactive group (e.g., an epoxy group, an isocyanate group, etc.), and a method of copolymerization of a cyclic siloxane oligomer such as hexamethylcyclotrisiloxane by anionic ring opening polymerization are exemplified. Of these methods, a method of using an initiator having a polysiloxane structure is easy and preferred.

As the polysiloxane structure introduced into the main chain of the fluorine-containing polymer fur use in the invention, a particularly preferred structure is a structure represented by the following formula (3):

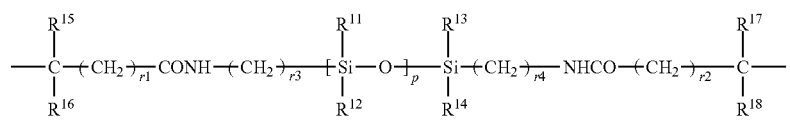

In formula (3), $R^{11}$, $R^{12}$, $R^{13}$ and $R^{14}$ each represents an alkyl group (preferably an alkyl group having from 1 to 5 carbon atoms, e.g., a methyl group, an ethyl group), or an aryl group (preferably an aryl group having from 6 to 10 carbon atoms, e.g., a phenyl group, a naphthyl group), these groups may further have a substituent, preferably a methyl group or a phenyl group, and especially preferably a methyl group.

$R^{15}$, $R^{16}$, $R^{17}$ and $R^{18}$ each represents a hydrogen atom, an alkyl group (preferably having from 1 to 5 carbon atoms, e.g., a methyl group, an ethyl group), an aryl group (preferably having from 6 to 10 carbon atoms, e.g., a phenyl group, a naphthyl group), an alkoxycarbonyl group (preferably having from 2 to 5 carbon atoms, e.g., a methoxycarbonyl group, an ethoxycarbonyl group), or a cyano group, preferably an alkyl group, an alkoxycarbonyl group, or a cyano group, and especially preferably a methyl group or a cyano group.

r1 and r2 each represents an integer of from 1 to 10, preferably an integer of from 1 to 6, and especially preferably an integer of from 2 to 4. r3 and r4 each represents an integer of from 0 to 10, preferably an integer of from 1 to 6, and especially preferably an integer of from 2 to 4. p represents an integer of from 5 to 500, preferably from 8 to 350, and especially preferably from 10 to 250.

Commercially available macroazo initiators "VPS-0501" and "VPS-1001" (trade names, manufactured by Wako Pure Chemical Industries) are compounds in which a couple of units falling under the category of the structure represented by formula (3) are linked via an azo group, and by the polymerization with the compound as the initiator, the unit can be introduced into a polymer to be obtained and preferred.

These polysiloxane structures are preferably introduced in the proportion of from 0.01 to 20 mass % in the fluorine-containing polymer for use in the invention, more preferably from 0.05 to 15 mass %, and especially preferably from 0.5 to 10 mass %.

By the introduction of the polysiloxane structure, an antifouling property and a dust-proof property are given to the film and, at the same time, a sliding property is imparted to the surface of the film to advantageously improve scratch resistance.

Other Polymerization Units:

The copolymerization components constituting the polymerization units other than the above can be selected from various aspects such as hardness, adhesion with a substrate, solubility in a solvent, transparency and the like. As such copolymerization components, vinyl ethers, e.g., methyl vinyl ether, ethyl vinyl ether, t-butyl vinyl ether, n-butyl vinyl ether, cyclohexyl vinyl ether, isopropyl vinyl ether, etc., and vinyl esters, e.g., vinyl acetate, vinyl propionate, vinyl butyrate, vinyl cyclohexanecarboxylate, etc., can be exemplified. These copolymerization components are introduced in the proportion of preferably from 0 to 40 mol %, and especially preferably in the proportion of from 0 to 20 mol %.

Preferred Forth of Fluorine-Containing Polymer:

An especially preferred form of the polymer in the invention is a form represented by the following formula (4):

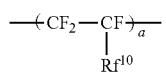
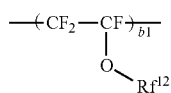
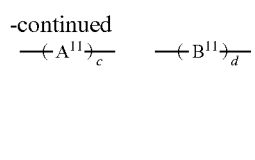

In formula (4), $Rf^{10}$ represents a perfluoroalkyl group having from 1 to 5 carbon atoms. With regard to the monomer constituting the portion represented by —$CF_2CF(Rf^{10})$—, the explanation described above as the examples of perfluoroolefin is applied. $Rf^{12}$ has the same meaning as defined above in the fluorine-containing vinyl ether ($Rf^{12}$ in the compound represented by formula (M2)) and the preferred range is also the same. $Rf^{11}$ has the same meaning as defined above in another fluorine-containing vinyl ether ($Rf^{11}$ in the compound represented by formula (M1)) and the preferred range is also the same.

$A^{11}$ and $B^{11}$ each represents a hydroxyl group-containing vinyl monomer polymerization unit, or an arbitrary constitutional unit. $A^{11}$ has the same meaning as defined above in the hydroxyl group-containing vinyl monomer polymerization unit, $B^{11}$ is not especially restricted but vinyl ethers and vinyl esters are more preferred in view of copolymerizability. Specifically, the monomers shown in the item of "Other polymerization units" above are exemplified.

$Y^{11}$ represents a constitutional unit having a polysiloxane structure, and the form thereof may be a polymerization unit having a graft portion containing a polysiloxane repeating unit represented by formula (1) on the side chain, or may contain a polysiloxane repeating unit represented by formula (1) on the main chain. The definition and preferred range are the same as explained in the item of "Constitutional unit having a polysiloxane structure" above.

a, b1, b2, c and d each represents a molar fraction (%) of each constitutional component, and a+b1+b2+c+d=100. Each of a to d satisfies the relationships of, $30 \leq a \leq 70$ (more preferably $30 \leq a \leq 60$, and still more preferably $35 \leq a \leq 60$), $0 \leq b1 \leq 40$ (more preferably $0 \leq b1 \leq 30$, and still more preferably $0 \leq b1 \leq 20$), $0 \leq b2 \leq 40$ (more preferably $0 \leq b2 \leq 30$, and still more preferably $0 \leq b1 \leq 20$), $10 \leq c \leq 70$ (more preferably $20 \leq c \leq 60$, and still more preferably $25 \leq c \leq 55$), and $0 \leq d \leq 40$ (more preferably $0 \leq d \leq 30$).

y represents the mass fraction (%) of the constitutional unit having a polysiloxane structure to the entire fluorine-containing polymer, which satisfies the relationship of $0.01 \leq y \leq 20$ (more preferably $0.05 \leq y \leq 15$, and still more preferably $0.5 \leq y \leq 10$).

The number average molecular weight of the fluorine-containing polymer used in the formation of a low refractive index layer in the antireflection film in the invention is preferably from 5,000 to 1,000,000, more preferably from 8,000 to 500,000, and especially preferably from 10,000 to 100,000.

Here, the number average molecular weight is the molecular weight measured by a GPC analyzer using columns such as "TSKgel GMHxL", "TSKgel G4000HxL", "TSKgel G2000HxL" (trade names, manufactured by Toso Corporation) as polystyrene equivalent, with solvent tetrahydrofuran (THF), and a differential refractometer.

The specific examples of polymers useful in the invention are shown in Tables 1 and 2 below, but the invention is by no means restricted thereto. In Tables 1 and 2, polymers are shown as the combination of polymerization units.

TABLE 1

| | | Fluorine-Containing Polymer | | | | | | |
|---|---|---|---|---|---|---|---|---|
| | | P1 | P2 | P3 | P4 | P5 | P6 | P7 |
| Constituents of Fluorine-Containing Polymer (molar fraction) (%) | HFP | 50 | 50 | 50 | 50 | 50 | 50 | 50 |
| | M1-(1) | | | | | | | |
| | M1-(2) | | | | | | | |
| | M2-(1) | | | | | | | |
| | HEVE | 50 | 50 | 50 | 40 | 40 | 40 | 45 |
| | HBVE | | | | | | | |
| | HOVE | | | | | | | |
| | DEGVE | | | | | | | |
| | HMcHVE | | | | | | | |
| | EVE | | | | 10 | 10 | 10 | |
| | cHVE | | | | | | | 5 |
| | tBuVE | | | | | | | |
| | Vac | | | | | | | |
| Polysiloxane-Containing Constituents (mass %) | FM-0721 | | | | | | 6 | |
| | FM-0725 | | 1.7 | | 4.9 | | | |
| | VPS-0501 | | | | | 3.4 | | |
| | VPS-1001 | | | 2.7 | | | | |
| Average molecular weight (×10,000) | | 1.5 | 1.7 | 2.1 | 4.5 | 2.8 | 2.5 | 1.8 |

| | | Fluorine-Containing Polymer | | | | | |
|---|---|---|---|---|---|---|---|
| | | P8 | P9 | P10 | P11 | P12 | P13 |
| Constituents of Fluorine-Containing Polymer (molar fraction) (%) | HFP | 50 | 50 | 45 | 40 | 50 | 50 |
| | M1-(1) | | | | | 15 | |
| | M1-(2) | | | | | | 15 |
| | M2-(1) | | | 5 | 10 | | |
| | HEVE | 32 | 32 | 35 | 50 | | |
| | HBVE | | | | | 35 | 35 |
| | HOVE | | | | | | |
| | DEGVE | | | | | | |
| | HMcHVE | | | | | | |
| | EVE | 18 | 18 | | | | |
| | cHVE | | | | | | |
| | tBuVE | | | | 15 | | |
| | Vac | | | | | | |
| Polysiloxane-Containing Constituents (mass %) | FM-0721 | | | | | | |
| | FM-0725 | | 8.1 | 5.1 | | | |
| | VPS-0501 | | | | | 1.7 | |
| | VPS-1001 | | | | 1 | | |
| Average molecular weight (×10,000) | | 4.2 | 3.6 | 3.5 | 4.1 | 2.5 | 1.4 |
| | | | | 40 | | | |

TABLE 2

| | | Fluorine-Containing Polymer | | | | | | |
|---|---|---|---|---|---|---|---|---|
| | | P14 | P15 | P16 | P17 | P18 | P19 | P20 |
| Constituents of Fluorine-Containing Polymer (molar fraction) (%) | HFP | 40 | 50 | 50 | 50 | 50 | 40 | 50 |
| | M1-(1) | 10 | | | 5 | | | 10 |
| | M1-(2) | 10 | | | | | | |
| | M2-(1) | | | | | | 10 | |
| | HEVE | | | | | | | |
| | HBVE | 15 | | | | | | |
| | HOVE | | 13 | 35 | 40 | 35 | | |
| | DEGVE | | | | | | 40 | 25 |
| | HMcHVE | | | | | | | |
| | EVE | 25 | | | | 15 | 10 | |
| | cHVE | | 37 | | | | | |
| | tBuVE | | | | 5 | | | 15 |
| | Vac | | | 15 | | | | |
| Polysiloxane-Containing Constituents (mass %) | FM-0721 | 4 | | | | 5 | | |
| | FM-0725 | | | | 4.1 | | 3.6 | |
| | VPS-0501 | | 5 | | | | | |
| | VPS-1001 | | | 4.9 | | | | 0.9 |
| Average molecular weight (×10,000) | | 3.2 | 2.6 | 3.4 | 3.9 | 2.9 | 3.5 | 2.8 |

TABLE 2-continued

| | | Fluorine-Containing Polymer | | | | | |
|---|---|---|---|---|---|---|---|
| | | P21 | P22 | P23 | P24 | P25 | P26 |
| Constituents of Fluorine-Containing Polymer (molar fraction) (%) | HFP | 45 | 50 | 50 | 50 | 50 | 40 |
| | M1-(1) | | | | | | |
| | M1-(2) | 5 | | | | | 10 |
| | M2-(1) | | | | | | |
| | HEVE | | | | | | |
| | HBVE | | | | | | |
| | HOVE | | | | | | |
| | DEGVE | 15 | 30 | | | | |
| | HMcHVE | | | 40 | 25 | 25 | 35 |
| | EVE | | | 10 | | | |
| | cHVE | | 20 | | 25 | | |
| | tBuVE | | | | | 10 | 15 |
| | VAc | 35 | | | | 15 | |
| Polysiloxane-Containing Constituents (mass %) | FM-0721 | | | | | | |
| | FM-0725 | | | 2.9 | 7.3 | | 4.8 |
| | VPS-0501 | 8 | | | | | |
| | VPS-1001 | | 9.7 | | | | |
| Average molecular weight (×10,000) | | 3.1 | 4.5 | 3.6 | 4.2 | 1.8 | 4.5 |

In the tables, in regard to the fluorine-containing constitutional components, the molar ratio of each component is shown. The abbreviations are as follows.
HFP: Hexafluoropropylene

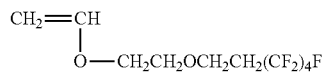

M1-(1):
$CH_2{=}CH$
  |
  $O{-}CH_2CH_2OCH_2CH_2(CF_2)_4F$

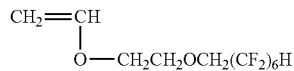

M1-(2):
$CH_2{=}CH$
  |
  $O{-}CH_2CH_2OCH_2(CF_2)_6H$

M2-(1): Heptafluoropropyl trifluorovinyl ether
HEVE: 2-Hydroxyethyl vinyl ether
HBVE: 4-Hydroxybutyl vinyl ether
HOVE: 8-Hydroxyoctyl vinyl ether
DEGVE: Diethylene glycol vinyl ether
HMcHVE: 4-(Hydroxymethyl)cyclohexylmethyl vinyl ether
EVE: Ethyl vinyl ether
cHVE: Cyclohexyl vinyl ether
tBuVE: t-Butyl vinyl ether
VAc: Vinyl acetate With regard to the constitutional components containing a polysiloxane structure, the names of components containing a polysiloxane structure used in the synthesizing reaction, and mass % of the components containing a polysiloxane structure in the entire polymer are shown. The abbreviations are as follows.
FM-0721: "SILAPLANE FM-0721" (manufactured by Chisso Corporation)
FM-0725: "SILAPLANE FM-0725" (manufactured by Chisso Corporation)
VPS-1001: "Macroazo initiator VPS-1001" (manufactured by Wako Pure Chemical Industries)
VPS-0501: "Macroazo initiator VPS-0501" (manufactured by Wako Pure Chemical Industries)
Synthesis of Fluorine-containing Polymer:

The fluorine-containing polymers for use in the invention can be synthesized by various polymerization methods, e.g., solution polymerization, precipitation polymerization, suspension polymerization, bulk polymerization, and emulsion polymerization can be used. Further, they can be synthesized by known operations, e.g., a batch process, a semi-continuous process and a continuous process can be used.

As the initiating method of polymerization, there are a method of using radical initiators, and a method of irradiation with rays or radiations. These polymerization processes and initiating methods are described, e.g., in Teiji Tsuruta, Kobunshi Gosei Hoho (Synthesis Methods of Polymers), revised Edition, Nikkan Kogyo Shinbun-sha (1971), and Takayuki Ohtsu, Masayoshi Kinoshita, Kobunshi GCosei no Jikkenho (Experimental Methods of Polymer Synthesis), pp. 124-154, Kagaku Dojin (1972).

Of the polymerization methods, a solution polymerization method using radical initiators is especially preferred. As the solvents for use in the solution polymerization method, various organic solvents are used alone or in combination of two or more, e.g., ethyl acetate, butyl acetate, acetone, methyl ethyl ketone, methyl isobutyl ketone, cyclohexanone tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol, and these solvents may be used as mixed solvents with water.

It is necessary to set the temperature of polymerization in connection with the molecular weight of the polymer to be formed, and the kind of initiator. The temperature is possible from 0° C. or less to 100° C. or more, but it is preferred to perform polymerization in the range of from 40 to 100° C.

The reaction pressure can be arbitrarily selected, but generally from 0.01 to 10 MPa, preferably from 0.05 to 5 MPa, and more preferably from 0.1 to 2 MPa. The reaction time is from 5 to 30 hours or so.

The obtained polymer of reaction solution can be used as it is for the use in the invention, or can be used by purifying by reprecipitation and separating operation of the solution.
Curing Agent (Crosslinking Agent):

A low refractive index layer in the invention is formed with a curable composition containing a fluorine-containing polymer containing a hydroxyl group, and a compound capable of reacting with the hydroxyl group in the fluorine-containing polymer (a curing agent), a so-called curable resin composition. It is preferred for the curing agent to have 2 or more sites capable of reacting with a hydroxyl group, and more preferably to have 4 or more sites.

The structures of the curing agents are not especially restricted so long as they have functional groups capable of reacting with a hydroxyl group in number described above, e.g., polyisocyanates, partial condensation products of isocyanate compounds, adducts with polymers and polyhydric alcohols, low molecular weight polyester films, etc., block polyisocyanate compounds of blocking an isocyanate group with a blocking agent such as phenol, aminoplasts, polybasic acids and anhydrides of polybasic acids can be exemplified.

Aminoplasts:

Above all in the invention, from the compatibility of preservation stability and the activity of crosslinking reaction, and the strength of the film to be formed, aminoplasts capable of crosslinking reaction with a compound containing a hydroxyl group under acidic conditions are preferred. Aminoplasts are compounds having a carbon atom contiguous to an amino group reactive with the hydroxyl group present in a fluorine-containing polymer, i.e., a hydroxylamino group or an alkoxylamino group, or a nitrogen atom, and substituted with an alkoxyl group. Specifically, e.g., melamine-based compounds, urea-based compounds and benzoguanamine-based compounds can be exemplified.

The melamine-based compounds are known as the compounds generally having a skeleton that a nitrogen atom is bonded to a triazine ring, and specifically melamine, alkylated melamine, methylolmelamine, and alkoxylated methylmelamine can be exemplified. In particular, methylolated melamine obtained by reacting melamine and formaldehyde under a basic condition and alkoxylated melamine, and derivatives thereof are preferred, and in view of preservation stability, alkoxylated methylmelamine is especially preferred. Methylolated melamine and alkoxylated melamine are not especially restricted and various resins obtained by the methods described, e.g., in Plastic Zairyo Koza (8) Urea.Melamine Jushi (A Course of Lecture on Plastic Materials (8) Urea.Melamine Resins), Nikkan Kogyo Shinbun-sha, can also be used.

As the urea-based compounds, in addition to urea, polymethylolated urea and the derivative thereof of alkoxylated methylurea, and compounds having a glycoluril skeleton and a 2-imidazolidinone skeleton that are cyclic urea structures are also preferred. In regard to amino compounds as the urea derivatives, various resins described in Urea.Melamine Resins can be used.

As the compounds preferably used in the invention as crosslinking agents, from the aspect of the compatibility with fluorine-containing polymers, melamine compounds and glycoluril compounds are especially preferred, and of these compounds, compounds having a nitrogen atom in the molecule and two or more carbon atoms substituted with an alkoxyl group contiguous to the nitrogen atom are preferred as crosslinking agents from the viewpoint of reactivity. Especially preferred compounds are compounds having a structure represented by the following structural formula (H-1) or (H-2), and partial condensation products thereof. In the formulae, R represents an alkyl group having from 1 to 6 carbon atoms or a hydroxyl group.

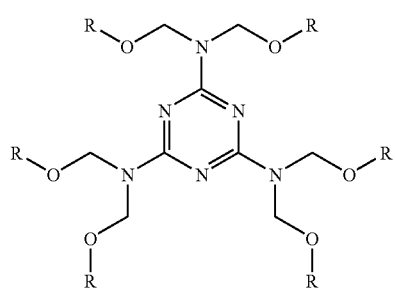

H-1

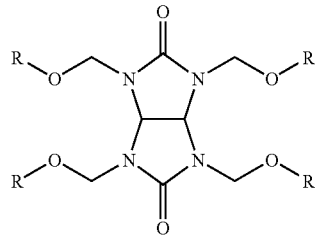

H-2

The amount of aminoplasts added to a fluorine-containing polymer is from 1 to 70 mass parts per 100 mass parts of the fluorine-containing polymer, preferably from 3 to 60 mass parts, and more preferably from 5 to 50 mass parts. When the addition amount is 1 mass part or more, durability as a thin film can be sufficiently exhibited, while when the amount is 70 mass parts or less, the low refractive index of a low refractive index layer can be preferably maintained in using for optics. With a view to maintaining the refractive index low even by the addition of a curing agent, a curing agent little in the increase in a refractive index is preferred, and in this point, a compound having the skeleton represented by formula (H-2) is more preferred of the above compounds.

Curing Catalyst:

In a low refractive index layer in the invention, a film is cured by the crosslinking reaction of the hydroxyl group of a fluorine-containing polymer and the curing agent while heating. In this series, since curing is accelerated by the action of an acid, it is preferred to add an acid material to a curable resin composition. However, if ordinary acids are added, crosslinking reaction progresses even in a coating solution, which causes failures. Accordingly, for the purpose of reconciling preservation stability and curing activity in a heat curable series, a compound capable of generating an acid by heating (hereinafter also referred to as a heat acid generator) is added as a curing catalyst.

Salt Comprising Acid and Organic Base:

A curing catalyst for use in the invention is a salt formed from an acid and an organic base. As the acids, organic acids, e.g., a sulfonic acid, a phosphonic acid, and a carboxylic acid, and inorganic acids, e.g., a sulfuric acid and a phosphoric acid are exemplified. From the viewpoint of having high catalysis of curing reaction and the compatibility with a polymer, organic acids having low pKa are more preferred, still more preferably a sulfonic acid and a phosphonic acid, and most preferably a sulfonic acid. The examples of preferred sulfonic acids include a p-toluenesulfonic acid (PTS), a benzenesulfonic acid (BS), a p-dodecylbenzenesulfonic acid (DBS), a p-chlorobenzenesulfonic acid (CBS), a 1,4-naphthalenedisulfonic acid (NDS), a methanesulfonic acid (MsOH), a nonafluorobutane-1-sulfonic acid (NFBS) and the like are exemplified, and all of these sulfonic acids are preferably used (enclosed in parentheses are abbreviations).

Organic Base:

By the kind of an organic base combined with an acid, acid generating efficiency of a curing catalyst at heating time greatly changes. That is, the lower the basicity of an organic base, the higher is the acid generating efficiency, so that it is preferred from the viewpoint of curing activity, but preservation stability is insufficient when the basicity is too low. Accordingly, it is preferred to use an organic base having appropriate basicity. Describing using pKa of a conjugate acid of an organic base (hereinafter, referred to as "pKa of an organic base") as the criterion of basicity of the organic base, it is necessary that the pKa of the organic base for use in the invention is from 5.0 to 13.0, preferably from 5.0 to 11.0, more preferably from 6.0 to 10.5, and still more preferably from 6.5 to 10.0. The values of pKa of organic bases in an aqueous solution are described in Kagaku Binran, Kiso-hen (Chemical Handbook, Elementary Course), revised 5$^{th}$ Ed., Vol. 2-II, pp. 334 to 340, compiled by Nippon Kagaku-kai, published by Maruzen Co., Ltd. (2004), from which an organic base having an appropriate pKa can be selected. Even if there is no description in Kagaku Binran, a compound that can be presumed to have structurally preferred pKa can also be preferably used. The compounds described in Kagaku Binran having proper pKa are shown in Table 3 below, but the compounds preferably used in the invention are not restricted thereto.

TABLE 3

Organic Base

| No. | Chemical Name | pKa |
| --- | --- | --- |
| b-1 | N,N-Dimethylaniline | 5.1 |
| b-2 | Benzimidazole | 5.5 |
| b-3 | Pyridine | 5.7 |
| b-4 | 3-Methylpyridine | 5.8 |
| b-5 | 2,9-Dimethyl-1,10-phenanthroline | 5.9 |
| b-6 | 4,7-Dimethyl-1,10-phenanthroline | 5.9 |
| b-7 | 2-Methylpyridine | 6.1 |
| b-8 | 4-Methylpyridine | 6.1 |
| b-9 | 3-(N,N-Dimethylamino)pyridine | 6.5 |
| b-10 | 2,6-Dimethylpyridine | 7.0 |
| b-11 | Imidazole | 7.0 |
| b-12 | 2-Methylimidazole | 7.6 |
| b-13 | N-Ethylmorpholine | 7.7 |
| b-14 | N-Methylmorpholine | 7.8 |
| b-15 | bis(2-Methoxyethyl)amine | 8.9 |
| b-16 | 2,2'-Iminodiethanol | 9.1 |
| b-17 | N,N-Dimethyl-2-aminoethanol | 9.5 |
| b-18 | Trimethylamine | 9.9 |
| b-19 | Triethylamine | 10.7 |

When used in the invention as an acid catalyst, the salt comprising an acid and an organic base may be isolated, or an acid and an organic base may be mixed to form a salt in a solution and the solution may be used. The acid and organic base may be used each one kind alone, or a plurality of kinds may be mixed. When an acid and an organic base are used as mixture, the equivalent ratio of the acid and organic base is preferably from 1/0.9 to 1.5, more preferably from 1/0.95 to 1.3, and still more preferably from 1/1.0 to 1.1.

The proportion of use of the acid catalyst is preferably from 0.01 to 10 mass parts per 100 mass parts of the fluorine-containing monomer in the curable resin composition, more preferably from 0.1 to 5 mass parts, and still more preferably from 0.2 to 3 mass parts.

Photosensitive Acid Generator:

In the invention, in addition to the heat acid generator, a compound capable of generating an acid upon irradiation with rays, i.e., a photosensitive acid generator can further be added. The photosensitive acid generator is a material giving photosensitivity to the film of the curable resin composition and capable of photo-curing the film upon irradiation with radiations such as rays.

As the representative photosensitive acid generators, e.g., (1) various kinds of onium salts such as an iodonium salt, a sulfonium salt, a phosphonium salt, a diazonium salt, an ammonium salt, a pyridinium salt, etc.; (2) sulfone compounds such as β-keto ester, β-sulfonylsulfone, and α-diazo compounds of these; (3) sulfonic esters such as alkylsulfonic ester, haloalkylsulfonic ester, arylsulfonic ester, iminosulfonate, etc.; (4) sulfonimide compounds; (5) diazomethane compounds; and others are exemplified, and they can be used arbitrarily.

The photosensitive acid generators may be used alone, or two or more may be used in combination. The proportion of use of the photosensitive acid generator is preferably from 0 to 20 mass parts per 100 mass parts of the fluorine-containing monomer in the curable resin composition, and more preferably from 0.1 to 10 mass parts. When the proportion of the photosensitive acid generator is not higher than the above least upper bound, the strength of the obtained cured film is excellent and good transparency can be secured.

Compound Having a Polysiloxane Structure:

Compounds having a polysiloxane structure are explained below.

For further improving scratch resistance and imparting an antifouling property by the provision of a sliding property, a compound having a polysiloxane structure may be used. The structure of the compound is not especially restricted, and those containing a plurality of dimethylsilyloxy units as the repeating units and having a substituent at the terminal and/or the side chain of the compound chain are preferred. Structural units other than the dimethylsilyloxy unit may be contained in the compound chain containing the dimethylsilyloxy units as the repeating units.

The molecular weight of the compound having a polysiloxane structure is not especially restricted, but preferably 100,000 or less, especially preferably 50,000 or less, and most preferably from 3,000 to 30,000.

In view of the prevention of transfer, it is preferred to contain a hydroxyl group or a functional group capable of forming a bond by reaction with a hydroxyl group. It is preferred that the reaction for forming a bond progresses rapidly under a heating condition and/or in the presence of a catalyst. Such a substituent includes an epoxy group or a carboxyl group.

The examples of the compounds having a preferred polysiloxane structure are shown below, but the invention is not restricted thereto.

Compounds Having a Hydroxyl Group:

"X-22-160AS", "KF-6001", "KF-6002", "KF-6003", "X-22-170DX", "X-22-176DX", "X-22-176D", "X-22-176F" (products of Shin-Etsu Chemical Co., Ltd.), "FM-4411", "FM-4421", "FM-4425", "FM-0411", "FM-0421", "FM-0425", "FM-DA11", "FM-DA21", "FM-DA25" (products of Chisso Corporation), "CMS-626", "CMS-222" (products of Gelest)

Compounds Having a Functional Group Reactive with a Hydroxyl Group:

"X-22-162C", "KF-105" (products of Shin-Etsu Chemical Co., Ltd.), "FM-5511", "FM-5521", "FM-5525", "FM-6611", "FM-6621", "FM-6625" (products of Chisso Corporation)

The addition amount of the compound having a polysiloxane structure is preferably from 0.01 to 20 mass % based on the fluorine-containing polymer, more preferably from 0.05 to 15 mass %, and still more preferably from 0.1 to 10 mass %.

Other Materials Contained in Curable Resin Composition:

In the antireflection film in the invention, the curable resin composition for use to form a low refractive index layer contains the fluorine-containing polymer, curing agent and curing catalyst, and may further contain, in addition to the compound having a polysiloxane structure used if necessary, inorganic fine particles, an organosilane compound, and other various additives, and these are used as a solution dissolved in an appropriate solvent. At this time, the concentration of the solids content of the curable resin composition is arbitrarily selected according to uses, and generally the concentration is from 0.01 to 60 mass %, preferably from 0.5 to 50 mass %, and especially preferably from 1 to 20 mass %.

Inorganic Fine Particles for Low Refractive Index Layer:

The blending amount of inorganic fine particles in a low refractive index layer is preferably from 1 to 100 mg/m$^2$, more preferably from 5 to 80 mg/m$^2$, and still more preferably from 10 to 60 mg/m$^2$. When the blending amount of inorganic fine particles is not lower than the greatest lower bound, scratch resistance can be conspicuously improved, and when it is not higher than the least upper bound, slight unevenness never forms on the surface of the low refractive index layer, so that unfavorable phenomena of degradations of external appearance such as enhancement of black and integrated reflectance due to the slight unevenness do not occur, accordingly it is preferred to keep the above range.

Since the inorganic fine particles are contained in a low refractive index layer, it is preferred that they have a low refractive index. For instance, magnesium fluoride and silica fine particles are exemplified. In the light of the refractive index, dispersion stability and costs, silica fine particles are especially preferred.

The particle size of these inorganic fine particles is preferably from 1 to 200 nm, and more preferably from 5 to 90 nm. When the particle size of the inorganic fine particles is not lower than the greatest lower bound, the improving effect of scratch resistance is great, and when not higher than the least upper bound, slight unevenness never forms on the surface of the low refractive index layer, so that unfavorable phenomena of degradations of external appearance such as enhancement of black and integrated reflectance due to the slight unevenness do not occur, accordingly it is preferred to keep the above range.

The inorganic fine particles may be crystalline or amorphous, may be monodispersed particles, or may be aggregate so long as the particles satisfy the prescribed particle size. A spherical shape is most preferred but amorphous particles can also be used with no problem.

Organosilane Compound:

A low refractive index layer in the invention may be formed of a curable composition further containing an organosilane compound. The definition of the organosilane compound and the preferred structures of the compound are the same as those disclosed in Jp-a-2004-331812, paragraphs (0131) and (0132).

Other Additives:

From the viewpoint of the interfacial adhesion of a low refractive index layer and the directly contacting lower layer, a small amount of a curing agent other than the polyfunctional (meth)acrylate compounds and polyfunctional epoxy compounds can also be added. The addition amount of such a curing agent is preferably 30 mass % or less based on the total solids content of the low refractive index layer, more preferably 20 mass % or less, and especially preferably 10 mass % or less.

For the purpose of giving water resistance and chemical resistance, in addition, enhancing an antifouling property and a sliding property, antifouling agents and sliding agents of known silicone compounds and fluorine compounds can be used arbitrarily besides the above-described compounds having a polysiloxane structure. When these compounds are used, they are preferably added in the range of from 0.01 to 20 mass % of the total solids content of the curable resin composition, more preferably from 0.05 to 10 mass %, and especially preferably from 0.1 to 5 mass %.

As the fluorine compounds, compounds having a fluoroalkyl group are preferred. The fluoroalkyl group preferably has from 1 to 20 carbon atoms, and more preferably from 1 to 10 carbon atoms, the fluoroalkyl group may have straight chain (e.g., —CF$_2$CF$_3$, —CH$_2$(CF$_2$)$_4$H, —CH$_2$(CF$_2$)$_8$CF$_3$, —CH$_2$CH$_2$(CF$_2$)$_4$H, etc.), may have a branched structure (e.g., —CH(CF$_3$)$_2$, —CH$_2$CF(CF$_3$)$_2$, —CH(CH$_3$)CF$_2$CF$_3$, —CH(CH$_3$)(CF$_2$)$_5$CF$_2$H, etc.), or may have an alicyclic structure (preferably a 5- or 6-membered ring, e.g., a perfluorocyclohexyl group, a perfluorocyclopentyl group, alkyl groups substituted by these groups, etc.), or may have an ether bond (e.g., —CH$_2$OCH$_2$CF$_2$CF$_3$, —CH$_2$CH$_2$OCH$_2$C$_4$F$_8$H, —CH$_2$CH$_2$OCH$_2$CH$_2$C$_8$F$_{17}$, —CH$_2$CH$_2$OCF$_2$CF$_2$OCF$_2$CF$_2$H, etc.). A plurality of fluoroalkyl groups may be contained in the same molecule.

It is preferred that the fluorine compounds further contain a substituent contributable to bond formation or compatibility with a low refractive index layer. It is preferred that a plurality of substituents are present, and the substituents may be the same or different. The examples of preferred substituents include an acryloyl group, a methacryloyl group, a vinyl group, an aryl group, a cinnamoyl group, an epoxy group, an oxetanyl group, a hydroxyl group, a polyoxyalkylene group, a carboxyl group, an amino group, and the like. The fluorine compounds may be polymers or oligomers with a compound not containing a fluorine atom, and the molecular weight is not especially restricted.

The amount of fluorine atoms in the fluorine compounds is not especially limited, but preferably 20 mass % or more, more preferably from 30 to 70 mass %, and most preferably from 40 to 70 mass %.

The preferred examples of the fluorine compounds include "R-2020", "M-2020", "R-3833", "M-3833"(trade names, manufactured by Daikin Industries Ltd.), "Megafac F-171", "Megafac F-172", "Megafac F-179A", "DEFENSA MCF-300" (trade names, manufactured by Dainippon Ink and Chemicals Inc.), but the invention is not restricted thereto.

To the curable resin composition for forming a low refractive index layer can also be added an optional amount of a dust-proof agent and an antistatic agent such as known cationic surfactants and polyoxyalkylene compounds for the purpose of imparting such characteristics as a dust-proof property and an antistatic property. These dust-proof agent and antistatic agent may be contained in the silicone compounds and fluorine compounds as the structural units being a part of their functions.

When these compounds are added as additives, they are preferably added in the range of from 0.01 to 20 mass % of the total solids content of the curable resin composition, more preferably from 0.05 to 10 mass %, and especially preferably from 0.1 to 5 mass %.

The examples of the preferred compounds include "Megafac F-150" (a trade name, manufactured by Dainippon Ink and Chemicals Inc.), "SH-3748" (a trade name, manufactured by Toray Dow Corning), but the invention is not restricted thereto.

Solvent:

In the invention, as the solvents for use in a coating solution (a curable resin composition) for forming a low refractive index layer, various kinds of solvents can be used, such as those selected from the viewpoints of capable of dissolving or dispersing each component, capable of easily becoming a uniform plane surface in a coating process or a drying process, capable of ensuring preservation stability of the solution, and having appropriate saturated vapor pressure. From the aspect of drying load, it is preferred to use a solvent having a boiling point of 100° C. or less at atmospheric pressure and room temperature as the main component and contain a solvent having a boiling point of 100° C. or more in a small amount for the adjustment of drying speed.

As the solvents having a boiling point of 100° C. or lower, hydrocarbons, e.g., hexane (boiling point: 68.7° C.), heptane (98.4° C.), cyclohexane (80.7° C.), and benzene (80.1° C.); halogenated hydrocarbons, e.g., dichloromethane (39.8° C.), chloroform (61.2° C.), carbon tetrachloride (76.8° C.), 1,2-dichloroethane (83.5° C.), and trichloroethylene (87.2° C.); ethers, e.g., diethyl ether (34.6° C.), diisopropyl ether (68.5° C.), dipropyl ether (90.5° C.), and tetrahydrofuran (66° C.); esters, e.g., ethyl formate (54.2° C.), methyl acetate (57.8° C.), ethyl acetate (77.1° C.), isopropyl acetate (89° C.); ketones, e.g., acetone (56.1° C.), and 2-butanone (equivalent to methyl ethyl ketone, 79.6° C.); alcohols, e.g., methanol (64.5° C.), ethanol (78.3° C.), 2-propanol (82.4° C.), and 1-propanol (97.2° C.); cyano compounds, e.g., acetonitrile (81.6° C.), and propionitrile (97.4° C.); and carbon disulfide (46.2° C.) are known. Of these solvents, ketones and esters are preferred, and ketones are especially preferred. Of ketones, 2-butanone is especially preferred.

As the solvents having a boiling point of 100° C. or higher, octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (equivalent to methyl isobutyl ketone (MIBK), 115.9° C.), 1-butanol (117.7° C.), N,N-dimethylformamide (153° C.), N,N-dimethylacetamide (166° C.), and dimethyl sulfoxide (189° C.) are known, and the preferred are cyclohexanone and 2-methyl-4-pentanone.

The low refractive index layer of the film in the invention can be formed by the following coating method, but the method is not restricted thereto.

In the first place, a coating solution containing the components for forming the low refractive index layer is prepared. The obtained coating solution is coated on a transparent support by a dip coating method, an air knife coating method, a curtain coating method, a roller coating method, a wire bar coating method, a gravure coating method, or an extrusion coating method (refer to U.S. Pat. No. 2,681,294), heated, and dried. Of these coating methods, when a coating solution is coated by a gravure coating method, as in the case of forming each layer of an antireflection film, a coating solution of a small coating amount can be highly uniformly coated and preferred. Of the gravure coating methods, a micro-gravure coating method is high in film thickness uniformity, so that more preferred.

The micro-gravure coating method for use in the invention is a coating method wherein a gravure roll having a diameter of from about 10 to 100 mm or so, preferably from about 20 to 50 mm or so, on which gravure patterns are marked on the entire circumference is rotated at the lower part of the support and inversely against the transporting direction of the support, while scraping off an excessive coating solution with a doctor blade from the surface of the gravure roll to thereby coat a prescribed amount of the coating solution by transfer on the under surface of the support at the position where the upper surface of the support is in a free state. The transparent support in a rolled up state is continuously unwound and at least one layer of a hard coat layer and a low refractive index layer containing a fluorine-containing olefin polymer can be coated on one side of the rewound support by the micro-gravure coating method.

As the coating conditions by the micro-gravure coating method, the line number of the gravure patterns marked on the gravure roll is preferably from 50 to 800 lines/inch, more preferably from 100 to 300 lines/inch, the depth of the gravure pattern is preferably from 1 to 600 μm, more preferably from 5 to 200 μm, the rotation number of the gravure roll is preferably from 3 to 800 rpm, more preferably from 5 to 200 μm, and the carrying speed of the support is preferably from 0.5 to 100 m/min, more preferably from 1 to 50 m/min.

To supply the film in the invention in high productivity, an extrusion method (a die coating method) is preferably used. Since the die coating method is a pre-measure system, the control of a film thickness is comparatively easy, and evapotranspiration of a solvent at a coating area is little, so that preferred.

After drying the solvent, the film of the invention can be cured by passing through a curing zone of the film by ionizing radiation and/or heating as a web. The process can be selected arbitrarily according to the materials used, e.g., curing may be by heat curing alone, or may be irradiation with ionizing radiation alone, or it is also preferred to be subjected to both processes successively.

The conditions of heat curing are not especially restricted so long as the binder is capable of causing a crosslinking reaction, but preferably the temperature is from 40 to 200° C., more preferably from 60 to 130° C., and most preferably from 80 to 120° C. The time of heat curing differs by the composition of curing components, and the kind and amount of the catalyst, but generally from 30 seconds to 24 hours, preferably from 60 seconds to 1 hour, and most preferably from 3 to 20 minutes.

A method of heating a film surface at a desired temperature is not especially restricted, but a method of heating a roll and contacting with a film, a method of blowing hot nitrogen, and the irradiation with far infrared rays or infrared rays are preferred. A method of heating by applying hot water or steam to a rotary metal roll as disclosed in Japanese Patent 2523574 can also be used. On the other hand, in a case where the temperature of a film surface rises at the time of irradiation with ionizing radiation, which is described below, a method of cooling the roll and contacting with the film can be utilized.

The kind of ionizing radiation in the invention is not especially restricted, and arbitrarily selected from among ultraviolet rays, electron beams, near ultraviolet rays, visible rays, near infrared rays, infrared rays, and X-rays according to the kind of a curing composition to form a film. Ultraviolet rays and electron beams are preferred, and ultraviolet rays are especially preferred for easy handling and capable of obtaining high energy with ease.

As the light sources of ultraviolet rays for the photo-polymerization of an ultraviolet reactive compound, any light sources can be used so long as they are light sources emitting ultraviolet rays. For instance, a low pressure mercury lamp, a middle pressure mercury lamp, a high pressure mercury lamp, an extra-high pressure mercury lamp, a carbon arc lamp, a metal halide lamp, and a xenon lamp can be used. An ArF excimer laser, a KrF excimer laser, an excimer lamp, and synchrotron radiation can also be used. Of these light sources, an extra-high pressure mercury lamp, a high pressure mercury lamp, a low pressure mercury lamp, a carbon arc lamp, a xenon arc lamp, and a metal halide lamp can be preferably used.

Electron beams can also be used similarly. As the electron beams, electron beams having energy of from 50 to 1,000 KeV, preferably from 100 to 300 KeV, emitted from various electron beam accelerators of, e.g., Cockcroft Walton type, Van De Graaff type, resonance transformer type, insulating core transformer type, linear type, Dynamitron type, and high frequency type can be exemplified.

The irradiation conditions differ according to each lamp, but irradiation dose of ray is preferably 10 mJ/cm$^2$ or more, more preferably from 50 to 10,000 mJ/cm$^2$, and especially preferably from 50 to 2,000 mJ/cm$^2$. At that time, the distribution of irradiation dose in the transverse direction of the web including both ends is preferably from 50 to 100% of the maximum irradiation dose to the central part, more preferably from 80 to 100%.

In the invention, it is preferred that at least one layer stacked on a support is cured by the process of irradiation with ionizing radiation in the state of the layer surface heated at 60° C. or more for 0.5 seconds or more from the initiation of irradiation in the atmosphere of oxygen concentration of 10 volume % or less.

It is also preferred to heat the layer at the same time with the ionizing radiation irradiation and/or successively in the atmosphere of oxygen concentration of 3 volume % or less.

In particular, it is preferred that the outermost and thin low refractive index layer is cured by this method. The curing reaction is accelerated by heat, and a film excellent in physical strength and chemical resistance can be formed.

The time of irradiation of ionizing radiation is preferably from 0.7 to 60 seconds, and more preferably from 0.7 to 10 seconds. When irradiation time is 0.5 seconds or shorter, the curing reaction cannot be completed, so that sufficient curing cannot be done. Further, maintaining a low oxygen condition for long time requires large size equipment, and a large quantity of inert gas is required, so that not desired.

It is preferred that the film in the invention is formed by crosslinking reaction or polymerization reaction of the ionizing radiation curable compound in the atmosphere of oxygen concentration of 6 volume % or less, more preferably oxygen concentration of 4 volume % or less, especially preferably oxygen concentration of 2 volume % or less, and most preferably 1 volume % or less. For reducing oxygen concentration beyond necessity, a large quantity of inert gas such as nitrogen is required, so that it is not preferred from the point of manufacturing costs.

With the curing rate of the lower layer of a low refractive index layer (100-residual functional group content) being a certain value less than 100%, when a low refractive index layer is formed on the lower layer and cured by ionizing radiation and/or heat, if the curing rate of the lower layer is higher than that at the time when the low refractive index layer has not been formed, the adhesion between the lower layer and the low refractive index layer is preferably improved.

Layer Constitution of Antireflection Film:

An antireflection film in the invention comprises a transparent support, according to necessity, a hard coat layer described later, and antireflection layers in consideration of refractive indexes, layer thickness of each layer, the number of layers, and the order of the layers so as to reduce the reflectance by optical interference.

The simplest constitution of a low reflective antireflection film has constitution comprising a substrate having coated thereon a low refractive index layer alone. For further reducing the reflectance, it is preferred to constitute an antireflection layer by the combination of a high refractive index layer having a refractive index higher than that of the substrate and a low refractive index layer having a refractive index lower than that of the substrate. As the examples of the layer constitutions, there are two-layer structure of a high refractive index layer/a low refractive index layer from the substrate side, and three-layer structure of lamination of three layers each having a different refractive index in the order from the substrate side, e.g., a middle index layer (higher in the refractive index than a substrate or a hard coat layer and lower in the refractive index than a high refractive index layer)/a high refractive index layer/a low refractive index layer, and constitutions comprising lamination of more antireflection layers are also proposed.

The examples of preferred layer constitutions of the antireflection film in the invention are shown below. In the following constitutions, the substrate film functions as a support.

Substrate film/low refractive index layer
Substrate film/antistatic layer/low refractive index layer
Substrate film/antiglare layer/low refractive index layer
Substrate film/antiglare layer/antistatic layer/low refractive index layer
Substrate film/antistatic layer/antiglare layer/low refractive index layer
Substrate film/hard coat layer/antiglare layer/low refractive index layer
Substrate film/hard coat layer/antiglare layer/antistatic layer/low refractive index layer
Substrate film/hard coat layer/antistatic layer/antiglare layer/low refractive index layer
Substrate film/hard coat layer/high refractive index layer/low refractive index layer
Substrate film/hard coat layer/antistatic layer/high refractive index layer/low refractive index layer
Substrate film/hard coat layer/middle refractive index layer/high refractive index layer/low refractive index layer
Substrate film/antiglare layer/high refractive index layer/low refractive index layer
Substrate film/antiglare layer/middle refractive index layer/high refractive index layer/low refractive index layer
Substrate film/antistatic layer/hard coat layer/middle refractive index layer/high refractive index layer/low refractive index layer
Antistatic layer/substrate film/hard coat layer/middle refractive index layer/high refractive index layer/low refractive index layer
Substrate film/antistatic layer/antiglare layer/middle refractive index layer/high refractive index layer/low refractive index layer
Antistatic layer/substrate film/antiglare layer/middle refractive index layer/high refractive index layer/low refractive index layer
Antistatic layer/substrate film/antiglare layer/high refractive index layer/low refractive index layer/high refractive index layer/low refractive index layer The layer constitutions are not especially restricted to these constitutions alone so long as the reflectance can be reduced by optical interference. A high refractive index layer may be a light scattering layer free of an antiglare property. It is preferred that an antistatic layer is a layer containing conductive polymer particles or fine particles of metal oxides (e.g., ATO, ITO), and an antistatic layer can be provided by coating or atmospheric plasma treatment.

(Layers Other than Low Refractive Index Layer)

Film-Forming Binder:

In the invention, as the main film-forming binder component of film-forming composition for forming layers other than a low refractive index layer, it is preferred to use a compound having an ethylenic unsaturated group in the points of film strength, the stability of a coating solution, and film productivity. The main film-forming binder means a film forming binder that accounts for 10 mass % or more of the film forming component excluding inorganic particles, preferably from 20 to 100 mass %, and more preferably from 30 to 95 mass %.

The film-forming binder is preferably a polymer having a saturated hydrocarbon chain or a polyether chain as the main chain, and more preferably a polymer having a saturated hydrocarbon chain as the main chain. As the binder polymer having a saturated hydrocarbon chain as the main chain and a crosslinking structure, (co)polymers comprising monomers having two or more ethylenic unsaturated groups are preferred.

For making a formed film high refractive index, it is preferred to introduce an aromatic ring, and at least one atom selected from a halogen atom other than a fluorine atom, a sulfur atom, a phosphorus atom and a nitrogen atom into the structure of the monomer.

The examples of the monomers having two or more ethylenic unsaturated groups include esters of polyhydric alcohol and (meth)acrylic acid (e.g., ethylene glycol di(meth)acrylate, 1,4-cyclohexane diacrylate, pentaerythritol tetra(meth)-acrylate, pentaerythritol tri(meth)acrylate, trimethylol-propane tri(meth)acrylate, trimethylolethane tri(meth)-acrylate, dipentaerythritol tetra(meth)acrylate, dipenta-erythritol penta(meth)acrylate, dipentaerythritol hexa-(meth)acrylate, pentaerythritol hexa(meth)acrylate, 1,2,3-cyclohexane tetra (meth)acrylate, polyurethane polyacrylate, polyester polyacrylate, etc.), vinylbenzene and derivatives thereof (e.g., 1,4-divinylbenzene, 4-vinylbenzoic acid-2-acryloyl-ethyl ester, 1,4-divinylcyclohexanone, etc.), vinyl sulfone (e.g., divinyl sulfone), acrylamide (e.g., methylene-bisacrylamide), and methacrylamide. These monomers may be in combination of two or more kinds.

In the present specification, "(meth)acrylate" means "acrylate or methacrylate".

As the specific examples of high refractive index monomers, bis(4-methacryloylthiophenyl) sulfide, vinyl-naphthalene, vinylphenyl sulfide, and 4-methacryloxyphenyl-4-methoxyphenyl thioether are exemplified. These monomers can also be used in combination of two or more kinds.

Polymerization of these monomers having an ethylenic unsaturated group can be performed by irradiation with ionizing radiation or heating in the presence of a photo-radical initiator or a thermal radical initiator.

As the photo-radical polymerization initiators, acetophenones, benzoins, benzophenones, phosphine oxides, ketals, antiraquinones, thioxanthones, azo compounds, peroxides, 2,3-dialkyldione compounds, disulfide compounds, fluoroamine compounds and aromatic sulfoniums are exemplified.

The examples of acetophenones include 2,2-diethoxy-acetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)butanone.

The examples of benzoins include benzoylbenzenesulfonic ester, benzointoluenesulfonic ester, benzoin methyl ether, benzoin ethyl ether, and benzoin isopropyl ether.

The examples of benzophenones include benzophenone, 2,4-dichlorobenzophenone, 4,4-dichlorobenzophenone, and p-chlorobenzophenone. The examples of phosphine oxides include 2,4,6-trimethylbenzoyldiphenylphosphine oxide.

Various examples of photo-radical initiators are also described in Saishin UV Koka Gijutsu (The Latest Techniques of UV Curing), p. 159, publisher, Kazuhiro Takasusuki, published by Gijutsu Joho Kyokai (1991), and these compounds can be used in the invention.

As commercially available photo-cleavage type photo-radical polymerization initiators, Irgacure 651, 184 and 907 (manufactured by Ciba Specialty Chemicals Inc.) can be exemplified as preferred examples.

Photo-polymerization initiators are preferably used in the range of from 0.1 to 15 mass parts per 100 mass parts of the polyfunctional monomer, and more preferably in the range of from 1 to 10 mass parts.

A photo-sensitizer may be used in addition to a photo-polymerization initiator. The specific examples of photo-sensitizers include n-butylamine, triethylamine, tri-n-butylphosphine, Michler's ketone and thioxanthone.

As the thermal radical polymerization initiators, organic or inorganic peroxides, organic azo and diazo compounds can be used. Specifically, the examples of organic peroxides include benzoyl peroxide, halogen benzoyl peroxide, lauroyl peroxide, acetyl peroxide, dibutyl peroxide, cumene hydroperoxide, and butyl hydroperoxide; the examples of inorganic peroxides include hydrogen peroxide, ammonium persulfate, potassium persulfate, etc.; the examples of azo compounds include 2-azobisisobutyronitrile, 2-azobis-propionitrile, 2-azobiscyclohexanedinitrile, etc.; and the examples of diazo compounds include diazoaminobenzene, p-nitrobenzenediazonium, etc.

Polymers having a polyether as the main chain can also be used in the invention, and as such polymers, ring opening polymers of polyfunctional epoxy compounds are preferred. Ring opening polymerization of a polyfunctional epoxy compound can be effected by irradiation with ionizing radiation or heating in the presence of a photo-acid generator or a heat-acid generator.

In place of or in addition to a monomer having two or more ethylenic unsaturated groups, crosslinkable functional groups may be introduced into a polymer by using a monomer having crosslinkable functional groups, and a crosslinking structure may be introduced to a binder polymer by the reaction of the crosslinkable functional groups.

The examples of crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydride, cyano acrylate derivative, melamine, etherified methylol, ester and urethane, and metal alkoxide, such as tetramethoxysilane, can also be used as monomers for introducing a crosslinking structure. A functional group showing a crosslinking property as a result of decomposition reaction, such as a block isocyanate group, can also be used as a crosslinkable functional group. That is, in the invention, crosslinkable functional groups may be those that show reactivity as a result of decomposition even if they do not show reactivity at once.

By coating binder polymers having these crosslinkable functional groups and then heating, a crosslinking structure can be formed.

(Hard Coat Layer)
Materials for Hard Coat Layer:

In the invention, it is preferred to provide a hard coat layer. A hard coat layer can combine an antiglare layer by the addition of matting particles for imparting an antiglare property to the binder. A hard coat layer can also combine a high refractive index layer by the addition of inorganic fillers for increasing a refractive index, prevention of shrinkage on crosslinking, and enhancement of strength. Further, organosilane compounds described above in the item of the low refractive index layer may be added to a hard coat layer.

Matting Particles:

For the purpose of imparting an antiglare property, a hard coat layer can contain matting particles having an average particle size of from 0.1 to 5.0 µm, preferably from 1.5 to 3.5 µm, which are larger than filler particles, e.g., particles of inorganic compounds or resin particles.

When the difference in refractive indexes between matting particles and a binder is too great) a film obtained becomes turbid to whitish, while when the difference is too small, sufficient light diffusion effect cannot be obtained, so that the difference in refractive indexes is preferably from 0.02 to 0.20, and especially preferably from 0.04 to 0.10. Similarly to the case of the refractive index difference, a film is turbid when the addition amount of matting particles to a binder is too great, and sufficient light diffusion effect cannot be obtained when the addition amount is too small, so that the amount is preferably from 3 to 30 mass %, and especially preferably from 5 to 20 mass %.

As the specific examples of the matting particles, particles of inorganic compounds, e.g., silica particles and $TiO_2$ particles, and resin particles, e.g., acrylic particles, crosslinked acrylic particles, polystyrene particles, crosslinked styrene particles, melamine resin particles, and benzoguanamine resin particles are preferably exemplified. Of these particles, crosslinked styrene particles, crosslinked acrylic particles, and silica particles are preferred.

The shape of the matting particles may be either a pearl-like or amorphous shape.

Further, two or more different kinds of matting particles may be used together.

When two or more matting particles are used, for effectively revealing refractive index control due to the mixture of the particles, the difference in refractive indexes is preferably from 0.02 to 0.10, and especially preferably from 0.03 to 0.07. It is possible to give an antiglare property by larger size matting particles and give other optical properties by smaller size matting particles. For instance, when an antireflection film is stuck on a high precision display of 133 ppi or more, it is required not to be accompanied by disorder in optical performance that is called glare. Glare results from the enlargement or reduction of pixels due to the unevenness (which contributes to an antireflection property) on the surface of the antireflection film to thereby lose the uniformity of luminance. This phenomenon can be greatly improved by using matting particles having a smaller particle size than the matting particles for providing an antiglare property and having a refractive index different from that of the binder.

The particle size distribution of the matting particles is preferably monodispersion. The particle size of each particle is preferably equivalent as far as possible. Taking the particles having particle sizes greater than the average particle size by 20% or more as coarse particles, the proportion of the coarse particles is preferably 1% or less of all the particle number, more preferably 0.1% or less, and still more preferably 0.01% or less. Matting particles having such particle size distribution are obtained by classification after ordinary synthesizing reaction. By increasing the number of times of classification or raising the degree of classification, matting particles having more preferred particle size distribution can be obtained.

The matting particles are contained in a hard coat layer so that the amount of the matting particles in the hard coat layer formed reaches preferably from 10 to 1,000 mg/m$^2$, and more preferably from 100 to 700 Mg/m$^2$.

The particle size distribution of the matting particles is measured with a coulter counter, and the measured particle size distribution is converted to particle number distribution.

Inorganic Filler:

For raising the refractive index of a layer and reducing shrinkage on curing, it is preferred to add inorganic filler to a hard coat layer in addition to the matting particles. For example, inorganic fillers comprising at least one oxide of metal selected from titanium, zirconium, aluminum, indium, zinc, tin and antimony, and having an average particle size of 0.2 μm or less, preferably 0.1 μm or less, and more preferably 0.06 μm or less are preferably used.

Further, in a hard coat layer containing high refractive index matting particles for the purpose of increasing the refractive index difference between matting particles, it is also preferred to use a silicon oxide for maintaining the refractive index of the layer lowish. The preferred particle size is the same as that of the above inorganic fillers.

The specific examples of inorganic fillers for use in a hard coat layer include $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are especially preferred for increasing a refractive index.

It is also preferred for the surfaces of inorganic fillers to be treated with a silane coupling agent or a titanium coupling agent, and surface treating agents having functional groups capable of reacting with the binder are preferably used on the surfaces of fillers.

The addition amount of these inorganic fillers is preferably from 10 to 90% of the entire mass of the hard coat layer, more preferably from 20 to 80%, and especially preferably from 30 to 70%.

These particle sizes of these fillers are sufficiently smaller than the wavelength of light, so that light scattering does not occur and a dispersion comprising a binder polymer having dispersed therein these fillers behaves as an optically uniform material.

The refractive index of the bulk of the mixture of a binder and inorganic filler in a hard coat layer in the invention is preferably from 1.48 to 2.00, more preferably from 1.50 to 1.80. The above range of refractive index can be reached by the arbitrary selection of the ratio of the kinds and the proportion of the amounts of binder and inorganic filler. How to select can be easily known in advance experimentally.

The thus-formed antireflection film in the invention has a haze value of from 3 to 70%, preferably from 4 to 60%, average reflectance at 450 to 650 nm is 3.0% or less, and preferably 2.5% or less. Due to the antireflection film having the above ranges of a haze value and average reflectance, good antiglare property and antireflection property can be obtained without being accompanied by the deterioration of transmitting images.

Support:

As the transparent support of the antireflection film in the invention, plastic films are preferably used. As the polymers for forming plastic films, cellulose ester (triacetyl cellulose and diacetyl cellulose, e.g., "TAC-TD80U" and "TAC-TD80UF", manufactured by Fuji Photo Film Co., Ltd. are representative), polyamide, polycarbonate, polyester (e.g., polyethylene terephthalate, polyethylene naphthalate, etc.), polystyrene, polyolefin, norbornene resins ("Arton" (a trade name, manufactured by JSR Corporation)), amorphous polyolefin ("Zeonex" (a trade name, manufactured by Zeon Corporation)) are exemplified. Of these polymers, triacetyl cellulose, polyethylene terephthalate and polyethylene naphthalate are preferred, and triacetyl cellulose is especially preferred.

A cellulose acylate film not substantially containing halogenated hydrocarbon such as dichloromethane and the like and the manufacturing methods thereof are described in Hatsumei Kyokai Kokai Giho (Kogi No. 2001-1745 (published on Mar. 15, 2001), hereinafter abbreviated to Kokai Giho 2001-1745), and the cellulose acylate described therein can also be preferably used in the invention.

Saponification Treatment:

When an antireflection film in the invention is used in an image display, the antireflection film is arranged on the outermost surface of the display by means of providing an adhesive layer on one side of the film and the like. When the transparent support of the antireflection film is triacetyl cellulose, the antireflection film of the invention can be used as it is as a protective film, since triacetyl cellulose is used as a protective film for protecting the polarizer of a polarizing plate, therefore economically advantageous.

When an antireflection film in the invention is arranged on the outermost surface of a display by means of providing an adhesive layer on one side of the film and the like, or when used as it is as a protective film of a polarizing plate, it is preferred to perform saponification treatment, for the purpose of ensuring sufficient adhesion, after forming an outermost layer comprising a fluorine-containing polymer as the main component on a transparent support.

Saponification treatment is carried out according to known means, e.g., immersing the film in an alkali solution for an appropriate time. After immersing in an alkali solution, it is preferred to sufficiently wash the film with water so that alkali components do not remain in the film, and neutralize alkali components by immersion in a dilute acid. By the saponification treatment the surface of the support opposite to the side having the outermost layer is hydrophilized.

The hydrophilized surface is especially effective for the improvement of the adhesion with a polarizer having polyvinyl alcohol as the main component. The hydrophilized surface is also effective to prevent defects or failures by dusts, since dusts in the air are hard to adhere to the hydrophilized surface and difficult to get into between the polarizer and the antireflection film in the adhesion with the polarizer.

It is preferred to perform saponification treatment such that the contact angle against water of the surface of the transparent support on the side opposite to the side on which the outermost layer is provided should be 40° or less, more preferably 30° or less, and especially preferably 20° or less.

A specific means of alkali saponification treatment can be selected from the following two means of (1) and (2). Means (1) is superior to means (2) for capable of treatment with the same process as the process of general purpose triacetyl cellulose film, but there are problems in that even the surface of the antireflection film is susceptible to saponification treatment, so that the film is deteriorated due to alkali hydrolysis of the surface, and that the solution of saponification treatment, if remains, leads to soiling. Means (2) is superior in this case, although the process is special (1) After forming an antireflection layer on a transparent support, the antireflection film is immersed in an alkali solution at least one time to subject the reverse of the antireflection film to saponification treatment.
(2) Before or after forming an antireflection layer on a transparent support, an alkali solution is coated on the surface of the side of the antireflection film opposite to the side on which an antireflection layer is formed, and the antireflection film is heated, washed with water and/or neutralized to subject only the reverse of the film to saponification treatment.

Forming Method of Film:

The antireflection film in the invention can be formed according to the following method, but the invention is not restricted to the method.

In the first place, a coating solution containing the components for forming each layer is prepared. The obtained coating solution is coated on a transparent support by a dip coating method, an air knife coating method, a curtain coating method, a roller coating method, a wire bar coating method, a gravure coating method, or an extrusion coating method (refer to U.S. Pat. No. 2,681,294), heated, and dried.

Of these coating methods, in coating according to a gravure coating method, a coating solution of a small coating amount can be highly uniformly coated as each layer of an antireflection film, and preferred. Of the gravure coating methods, a micro-gravure coating method is high in film thickness uniformity, so that more preferred.

By using a die coating method, a coating solution of a small coating amount can also be highly uniformly coated. Since the die coating method is a pre-measure system, the control of a film thickness is comparatively easy, and evapotranspiration of a solvent at a coating area is little, so that preferred.

In an antireflection film comprising a plurality of layers, two or more layers may be coated simultaneously. Simultaneous coating methods are described in U.S. Pat. Nos. 2,761, 791, 2,941,898, 3,508,947, 3,526,528, and Yuji Harasaki, Coating Kogaku (Coating Engineering), p. 253, Asakura Shoten (1973).

(Use of Antireflection Film)
Polarizing Plate:

A polarizing plate mainly includes two protective films sandwiching a polarizer from both surfaces. It is preferred to use the antireflection film in the invention as at least one of two protective films sandwiching a polarizer from both surfaces. Since the antireflection film of the invention doubles as a protective film, the manufacturing costs of the polarizing plate can be reduced. By the use of the antireflection film of the invention as the outermost layer, mirroring of outer light can be prevented, and a polarizing plate excellent in scratch resistance and an antifouling property can be obtained.

Polarizer:

As the polarizer, known polarizers, and polarizers cut out from a long size polarizer whose absorption axis is not parallel or not perpendicular to the machine direction may be used.

A long size polarizer whose absorption axis is not parallel or not perpendicular to the machine direction is formed by the following method. That is, the polarizer is manufactured by a method of stretching a continuously supplied polymer film with holding both ends with holding means while applying tensile force, stretching the film at least 1.1 to 20.0 times in the transverse direction of the film, the difference in traveling speeds in the machine direction of the holding means of both ends of the film is within 3%, and bending the film traveling direction in the state of holding both ends, so that the angle formed by the traveling direction of the film and the substantial stretching direction of the film at the outlet of the process of holding both ends of the film is inclined by 20 to 70°. In particular, a film given an inclination by 45° is preferably used from the point of productivity.

A stretching method of a polymer film is disclosed in detail in JP-A-2002-86554, paragraphs (0020) to (0030).

Image Display:

When used as one side of the surface protective films of a polarizer, the antireflection film of the invention can be preferably applied to transmitting type, reflection type and semi-transmitting type liquid crystal displays of the modes of twisted nematic (TN), super twisted nematic (STN), vertical alignment (VA), in-plane switching (IPS), optically compensated bend cell (OCB), etc.

VA mode liquid crystal cell includes:
(1) VA mode liquid crystal cell in a narrow sense of substantially perpendicularly orientating rod-like liquid crystal molecules when no voltage is applied, and substantially horizontally orientating when voltage is applied (e.g., JP-A-2-176625),
(2) Liquid crystal cell having multi-domains of a VA mode (MVA mode) for widening angle of visibility (SID97, described in Digest of Tech. Papers, (drafts) 28, p. 845 (1997)), (3) Liquid crystal cell of a mode of substantially perpendicularly orientating rod-like liquid crystal molecules when no voltage is applied, and twisted multi-domain orientating when voltage is applied (n-ASM mode) (described in the drafts of Liquid Crystal Forum, Japan, pp. 58-59 (1998)), and (4) SURVAIVAL mode liquid crystal cell (released at LCD International 98).

In VA mode liquid crystal cell, a polarizing plate manufactured by the combination of a biaxially stretched triacetyl cellulose film and the antireflection film in the invention is preferably used. As the manufacturing method of the biaxially stretched triacetyl cellulose film, it is preferred to use the methods disclosed in JP-A-2001-249223 and JP-A-2003-170492.

OCB mode liquid crystal cell is a liquid crystal display using liquid crystal cell of bend orientation mode of orientating rod-like liquid crystal molecules substantially reverse directions (symmetrically) at the upper and lower of the liquid crystal cell, and this is disclosed in U.S. Pat. Nos. 4,583,825 and 5,410,422. Since the rod-like liquid crystal molecules are orientated symmetrically at the upper and lower of the liquid crystal cell, the liquid crystal cell of bend orientation mode has a self-optical compensation function. Therefore, this liquid crystal mode is also called OCB (Optically Compensatory Bend) liquid crystal mode. The liquid crystal display of the bend orientation mode has the advantage that response speed is quick.

In ECB mode liquid crystal cell, rod-like liquid crystal molecules are substantially horizontally orientated when voltage is not applied, and ECB mode liquid crystal cell is most widely used as color TFT liquid crystal display, and descriptions are seen in many literatures, for example, in EL, PDP, LCD Displays, published by Toray Research Center (2001).

As disclosed in JP-A-2001-100043, etc., by using, in particular in TN mode and IPS mode liquid crystal displays, an optically compensatory film having the effect of widening the angle of visibility on the side opposite to the side on which an antireflection film of the invention is used as one of two obverse and reverse protective films of a polarizer, a polarizing plate having antireflection effect and the widening effect of the angle of visibility can be obtained by the thickness of one polarizing plate, so that very preferred.

EXAMPLE

The invention will be described in greater detail with reference to examples, but the invention is by no means restricted thereto. In the following examples and synthesis examples, % represents mass % (weight %) unless otherwise indicated.

Manufacture of Antireflection Film:
Synthesis of Fluorine-containing Polymer:

Synthesis Example 1

Synthesis of Fluorine-Containing Polymer (P2)

An autoclave having a capacity of 100 ml equipped with a stainless steel stirrer were charged with 18.5 g of ethyl acetate, 8.8 g of hydroxyethyl vinyl ether (HEVE), 1.0 g of SILAPLANE FM-0725 (manufactured by Chisso Corporation), and 0.40 g of "V-65" (a thermal radical generator, manufactured by Wako Pure Chemical Industries), and the reaction system was deaerated and replaced with nitrogen gas. Hexafluoro-propylene (HFP) (15 g) was further introduced to the autoclave and the temperature was raised to 62° C. The pressure at the time when the temperature in the autoclave reached 62° C. was 8.9 kg/cm$^2$. The reaction was continued for 9 hours while maintaining the temperature in the autoclave at 62° C., heating was stopped at a point of time when the pressure reached 6.2 kg/cm$^2$, and the reaction solution was allowed to cool.

At a point of time when inner temperature lowered to room temperature, unreacted monomer was purged, the autoclave was opened and reaction solution was taken out. The obtained reaction solution was thrown into a mixture of greatly excessive hexane and 2-propanol, the solvent was got rid of by decantation, and a precipitated polymer was taken out. The polymer was further dissolved in a small amount of ethyl acetate, subjected to reprecipitation from hexane and 2-propanol two times to completely remove the residual monomer, and the resulted product was dried under reduced pressure to obtain 8.3 g of (P2). The number average molecular weight of the obtained polymer was 17,000.

Synthesis Example 2

Synthesis of Fluorine-Containing Polymer (P3)

The autoclave having a capacity of 100 ml equipped with a stainless steel stirrer were charged with 30 g of ethyl acetate, 8.8 g of hydroxyethyl vinyl ether (HEVE), 0.88 g of "VPS-1001" (macroazo initiators, manufactured by Wako Pure Chemical Industries), and 0.29 g of lauroyl peroxide, and the reaction system was deaerated and replaced with nitrogen gas. Hexafluoropropylene (HFP) (15 g) was further introduced to the autoclave and the temperature was raised to 70° C. The pressure at the time when the temperature in the autoclave reached 70° C. was 9.0 kg/cm$^2$. The reaction was continued for 9 hours while maintaining the temperature in the autoclave at 70° C., heating was stopped at a point of time when the pressure reached 6.0 kg/cm$^2$, and the reaction solution was allowed to cool.

At a point of time when inner temperature lowered to room temperature, unreacted monomer was purged, the autoclave was opened and reaction solution was taken out. The obtained reaction solution was thrown into a mixture of greatly excessive hexane and 2-propanol, the solvent was got rid of by decantation, and a precipitated polymer was taken out. The polymer was further dissolved in a small amount of ethyl acetate, subjected to reprecipitation from hexane and 2-propanol two times to completely remove the residual monomer, and the resulted product was dried under reduced pressure to obtain 19.3 g of (P3). The number average molecular weight of the obtained polymer was 21,000.

Synthesis Examples 3 to 9

Fluorine-containing polymers (P1), (P4), (P8), (P9), (P14), (P19) and (P25) were synthesized according to almost the same manner as in Synthesis Example 1. The number average molecular weight of each fluorine-containing polymer obtained is as shown in Tables 1 and 2 above.

Synthesis Example 10

Synthesis of 4-Methylmorpholine Salt of p-Toluenesulfonic Acid

4-Methylmorpholine (3.0 g) was dissolved in 30 ml of 2-butanone, and 5.7 g of p-toluenesulfonic acid monohydrate was added to the above solution little by little while stirring.

After further stirring for 1 hour, the solvent was distilled off under reduced pressure, and the obtained solid was recrystallized from acetone, whereby 6.1 g of 4-methyl-morpholine salt of p-toluenesulfonic acid was obtained.

In the invention, as a curing catalyst, the salt as obtained in Synthesis Example 11 may be used, or a mixed solution of an organic base and an acid as the solution before the solvent is distilled off under reduced pressure in Synthesis Example 11 may be used as it is. Each salt comprising an acid and an organic base shown in Table 4 below was prepared in the similar method.

Manufacture of Antireflection Film:

Examples 1-1 to 1-38 and Comparative Examples 1-1 to 1-6

Preparation of Coating Solutions (LLL-1) to (LLL-38) and (LLRL-1) to (LLRL-4) for Low Refractive Index Layers The components of each solution as shown in Table 4 were mixed and dissolved in 2-butanone to prepare a coating solution for a low refractive index layer having a solids content of 6%. In Table 4, the numeral in parentheses is the mass part of the solid content of each component.

TABLE 4

| | | Coating Solution for Low Refractive Index Layer | | | | | | | | | |
|---|---|---|---|---|---|---|---|---|---|---|---|
| | | Fluorine-Containing Polymer | | Curing Agent | | Curing Catalyst | | | | Polysiloxane | | Colloidal Silica |
| | No. | Kind | Use Amount | Kind | Use Amount | Acid | Base | Way of Addition | Use Amount | Kind | Use Amount | Use Amount |
| Inv. | LLL-1 | P1 | (64) | CY303 | (16) | PTS | b-19 | Solution | (1.0) | FM4425 | (2.5) | (20) |
| Inv. | LLL-2 | P1 | (80) | H-21 | (20) | PTS | b-14 | Solid | (1.0) | CMS626 | (2.0) | — |
| Inv. | LLL-3 | P1 | (90) | H-11 | (10) | PTS | b-14 | Solution | (1.5) | 160AS | (1.5) | — |
| Inv. | LLL-4 | P2 | (85) | H-11 | (15) | PTS | b-19 | Solution | (1.0) | — | — | — |
| Inv. | LLL-5 | P2 | (64) | H-11 | (16) | PTS | b-14 | Solid | (1.5) | — | — | (20) |
| Inv. | LLL-6 | P2 | (81) | H-11 | (9) | PTS | b-14 | Solution | (1.5) | — | — | (10) |
| Comp. | LLRL-1 | P2 | (64) | H-11 | (16) | PTS | — | Solid | (1.0) | — | — | (20) |
| Comp. | LLRL-2 | P2 | (64) | H-11 | (16) | PTS + Et₄N | | Solid | (1.7) | — | — | (20) |
| Inv. | LLL-7 | P2 | (85) | H-21 | (15) | PTS | b-14 | Solid | (1.2) | — | — | — |
| Inv. | LLL-8 | P2 | (85) | H-21 | (15) | PTS | b-14 | Solution | (1.2) | — | — | — |
| Inv. | LLL-9 | P2 | (63) | H-21 | (7) | DBS | b-15 | Solution | (1.2) | — | — | (10) |
| Inv. | LLL-10 | P2 | (64) | H-21 | (16) | PTS | b-3 | Solid | (0.8) | — | — | (20) |
| Comp. | LLRL-3 | P2 | (85) | H-21 | (15) | PTS | — | Solid | (0.8) | — | — | — |
| Comp. | LLRL-4 | P2 | (64) | H-21 | (15) | PTS + Et₄N | | Solid | (1.3) | — | — | — |
| Inv. | LLL-11 | P2 | (85) | CY303 | (15) | PTS | b-10 | Solution | (1.0) | — | — | — |
| Inv. | LLL-12 | P2 | (63) | CY303 | (7) | NFBS | b-13 | Solution | (1.0) | — | — | (30) |
| Inv. | LLL-13 | P2 | (64) | MX270 | (16) | PTS | b-12 | Solution | (1.5) | — | — | (20) |
| Inv. | LLL-14 | P3 | (90) | H-11 | (10) | PTS | b-14 | Solid | (1.0) | — | — | — |
| Inv. | LLL-15 | P3 | (64) | H-11 | (16) | PTS | b-10 | Solution | (1.5) | — | — | (20) |
| Inv. | LLL-16 | P3 | (90) | H-21 | (10) | PPA | b-17 | Solution | (1.0) | — | — | — |
| Inv. | LLL-17 | P3 | (72) | H-21 | (18) | NDS | b-13 | Solid | (1.0) | — | — | (10) |
| Inv. | LLL-18 | P3 | (64) | CY303 | (16) | PTS | b-19 | Solution | (1.2) | — | — | (20) |
| Inv. | LLL-19 | P4 | (85) | H-11 | (15) | CBS | b-3 | Solution | (2.0) | — | — | — |
| Inv. | LLL-20 | P4 | (80) | H-21 | (20) | PTS | b-14 | Solution | (2.0) | — | — | — |
| Inv. | LLL-21 | P4 | (64) | H-21 | (16) | PTS | b-10 | Solution | (1.5) | — | — | (20) |
| Inv. | LLL-22 | P4 | (90) | CY303 | (10) | PTS | b-19 | Solution | (1.0) | — | — | — |
| Inv. | LLL-23 | P4 | (72) | MX270 | (8) | DBS | b-17 | Solution | (1.5) | — | — | (20) |
| Inv. | LLL-24 | P8 | (56) | CY303 | (14) | PTS | b-14 | Solution | (1.5) | FM4425 | (2.5) | (30) |
| Inv. | LLL-25 | P8 | (80) | CY303 | (20) | PTS | b-13 | Solid | (1.8) | CMS626 | (2.0) | — |
| Inv. | LLL-26 | P8 | (64) | H-11 | (16) | NFBS | b-10 | Solution | (1.5) | 160AS | (3.0) | (20) |
| Inv. | LLL-27 | P8 | (72) | H-21 | (18) | PTS | b-8 | Solution | (1.5) | FM4425 | (2.5) | (10) |
| Inv. | LLL-28 | P9 | (72) | CY303 | (8) | PTS | b-14 | Solution | (1.2) | — | — | (20) |
| Inv. | LLL-29 | P9 | (56) | CY303 | (14) | PTS | b-17 | Solution | (1.5) | — | — | (30) |
| Inv. | LLL-30 | P9 | (85) | H-11 | (15) | NDS | b-13 | Solid | (1.0) | — | — | — |
| Inv. | LLL-31 | P9 | (68) | H-21 | (17) | DBS | b-10 | Solution | (2.0) | — | — | (15) |
| Inv. | LLL-32 | P14 | (85) | H-11 | (15) | PTS | b-19 | Solid | (1.5) | — | — | — |
| Inv. | LLL-33 | P14 | (76.5) | H-21 | (8.5) | MsOH | b-7 | Solution | (1.0) | — | — | (15) |
| Inv. | LLL-34 | P14 | (75) | MX270 | (25) | PTS | b-18 | Solid | (1.5) | — | — | — |
| Inv. | LLL-35 | P19 | (72) | H-11 | (18) | PPA | b-15 | Solution | (1.0) | — | — | (10) |
| Inv. | LLL-36 | P19 | (80) | H-21 | (20) | PTS | b-1 | Solution | (1.5) | — | — | — |
| Inv. | LLL-37 | P25 | (64) | H-21 | (16) | PTS | b-3 | Solid | (1.0) | 160AS | (1.0) | (20) |
| Inv. | LLL-38 | P25 | (56) | CY303 | (14) | BS | b-13 | Solution | (2.0) | FM4425 | (2.0) | (30) |

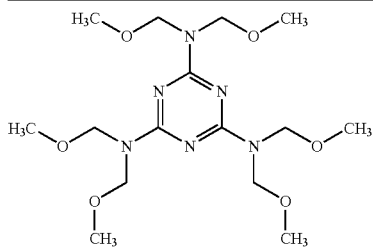

H-11

TABLE 4-continued

Coating Solution for Low Refractive Index Layer

| No. | Fluorine-Containing Polymer Kind | Use Amount | Curing Agent Kind | Use Amount | Curing Catalyst Acid | Base | Way of Addition | Use Amount | Polysiloxane Kind | Use Amount | Colloidal Silica Use Amount |
|---|---|---|---|---|---|---|---|---|---|---|---|

H-21 structure:

H₃C—O—CH₂—N(C=O)N—CH₂—O—CH₃ / H₃C—O—CH₂—N—N—CH₂—O—CH₃ (imidazolidine-2,4-dione-based structure)

H-21

In Table 4:
CY303: "CYMEL 303", methylolated melamine, manufactured by Cytec Industries Inc.)
MX270: "Nicalack MX-270", tetramethoxymethyl glycoluril, manufactured by Sanwa Chemical Co., Ltd.
FM4425: "FM-4425", a compound having a polysiloxane structure, manufactured by Chisso Corporation
CMS626: "CMS-626", a compound having a polysiloxane structure, manufactured by Gelest
160AS: "X-22-160AS", a compound having a polysiloxane structure, manufactured by Shin-Etsu Chemical Co., Ltd.
Colloidal silica: "MEK-ST", manufactured by Nissan Chemical Industries, Ltd.
H-11, H-21: Compounds having the structures shown below.
The abbreviations of curing catalysts are as follows.
PTS: P-Toluenesulfonic acid
DBS: p-Dodecylbenzenesulfonic acid
NFBS: Nonafluorobutane-1-sulfonic acid
NDS: 1,4-Naphthalenedisulfonic acid
CBS: p-Chlorobenzenesulfonic acid
MsOH: Methanesulfonic acid
BS: Benzenesulfonic acid
PPA: Phenylphosphonic acid
PTS·Et₄N: Tetraethylammonium p-toluenesulfonate The column of "Way of Addition" shows the way of preparation and use of a salt, and "solid" is the case of using a salt of an acid and an organic base after isolation, and "solution" is the case of preparing and using a solution containing an equivalent amount of an acid and an organic base.

Manufacture of Hard Coat Layer Coating Solution (HCL-1):

| | |
|---|---|
| "PET-30" | 50.0 g |
| "Irgacure 184" | 2.0 g |
| "SX-350" (30%) | 1.5 g |
| Crosslinked acryl-styrene particles (30%) | 13.9 g |
| "KBM-5103" | 10.0 g |
| Toluene | 38.5 g |

The above mixed solution was filtered through a polypropylene filter having a pore diameter of 30 μm to prepare hard coat layer coating solution (HCL-1).

The compounds used are shown below.
"PET-30": A mixture of pentaerythritol triacrylate and pentaerythritol tetraacrylate (manufactured by Nippon Kayaku Co., Ltd.)
"Irgacure 184": A polymerization initiator (manufactured by Ciba Specialty Chemicals Inc.)
"SX-350": Crosslinked polystyrene particles having an average particle size of 3.5 μm (refractive index: 1.60, 30% toluene dispersion, used after dispersing at 10,000 rpm for 20 minutes with POLYTRON disperser, manufactured by The Soken Chemical & Engineering Co., Ltd.)
Crosslinked acryl-styrene particles: Having an average particle size of 3.5 μm (refractive index: 1.55, 30% toluene dispersion, used after dispersing at 10,000 rpm for 20 minutes with POLYTRON disperser, manufactured by The Soken Chemical & Engineering Co., Ltd.)
"KBM-5103": Acryloyloxypropyltrimethoxysilane (manufactured by Shin-Etsu Chemical Co., Ltd.)

Manufacture of Antireflection Film (101):

A triacetyl cellulose film "TAC-TD80U" (manufactured by Fuji Photo Film Co., Ltd.) having a thickness of 80 μm was rewound in a rolled up state. The above prepared hard coat layer coating solution (HCL-1) was directly coated on the film with a micro gravure roll of a diameter of 50 mm and having a gravure pattern of line number 180/inch, a depth of 40 μm, and a doctor blade on the conditions of gravure roll rotation number of 30 rpm and a traveling speed of 30 nm/min. After that, the coated layer was dried at 60° C. for 150 seconds, and then cured by irradiation with ultraviolet ray, while maintaining the atmosphere of oxygen concentration of 0.1 volume % by nitrogen purge, with an air-cooled metal halide lamp of 160 W/cm (manufactured by EYE-GRAPHICS, CO., LTD.) at illumination intensity of 400 mW/cm² and quantity of radiation of 110 mJ/cm², whereby a layer having a thickness of 6 μm was formed, and wound. The thus-obtained hard coat layer had surface roughness Ra of 0.18 μm, Rz of 1.40 μm, and haze of 35%.

Antireflection film sample (101) was manufactured by coating low refractive index layer coating solution (LLL-1) on the thus-obtained hard coat layer in a thickness of 95 nm. The low refractive index layer was dried at 120° C. for 10 minutes, and the layer was cured by irradiation with ultraviolet ray, while maintaining the atmosphere of oxygen concentration of 0.01 volume % or less by nitrogen purge, with an air-cooled metal halide lamp of 240 W/cm (manufactured by EYEGRAPHICS, CO., LTD.) at illumination intensity of 120 mW/cm² and quantity of radiation of 240 mJ/cm².

Manufacture of Antireflection Films (102) to (138) and (R01) to (R04):

Antireflection films (102) to (138) were manufactured in the same manner as in the manufacture of antireflection film sample (101), except that any of low refractive index layer coating solutions (LLL-2) to (LLL-38) was used in place of (LLL-1). Further, comparative antireflection films (R01) to (R04) were manufactured in the same manner as in the manufacture of antireflectional film sample (101), except that any of low refractive index layer coating solutions (LLRL-2) to (LLRL-4) was used in place of (LLL-1).

Saponification Treatment of Antireflection Film:

Each antireflection film obtained was subjected to saponification treatment on the following conditions, and dried.
Alkali bath: 1.5 mmol/dm³ sodium hydroxide aqueous solution, 55° C., 120 seconds
First washing bath: City water, 60 seconds
Neutralizing bath: 0.05 mol/dm³ sulfuric acid, 30° C., 20 seconds
Second washing bath: City water, 60 seconds
Drying: 120° C., 60 seconds Evaluation of Antireflection Film:

With the thus-obtained antireflection film subjected to saponification treatment, the following evaluations were performed.

(Evaluation 1) Measurement of Average Reflectance:

The spectral reflectance at the incident angle 5° of each antireflection film sample was measured with an integrating sphere in the wavelength region of from 380 to 780 nm by a spectrophotometer "V-550" (manufactured by JASCO CORPORATION). In the evaluation of spectral reflectance, the average reflectance in 450 to 650 nm was used.

After the reverse of the antireflection film was subjected to surface roughening treatment, light absorption treatment was performed with black ink (transmittance at 380 to 780 nm was less than 10%) and the reflectance was measured on a black stand.

Incidentally, the later-described sample processed into a polarizing plate was used for measurement in the form of the polarizing plate as it was. In the case of a display not using a polarizing plate, after the reverse of the antireflection film was subjected to surface roughening treatment, light absorption treatment was performed with black ink (transmittance at 380 to 780 nm was less than 10%) and the reflectance was measured on a black stand.

(Evaluation 2) Evaluation of Scratch Resistance by Rubbing with Eraser:

A rubbing test was performed with a rubbing tester on the following conditions. Environmental conditions of evaluation: 25° C., 60% RH
Rubbing material: A plastic eraser ("MONO", manufactured by TOMBOW PENCIL CO., LTD.) was fixed at the rubbing tip of the tester (1 cm×1 cm) that is in contact with a sample.
Traveling length (one way): 4 cm
Rubbing speed: 2 cm/sec
Load: 500 g/cm²
Contact area at tip: 1 cm×1 cm
Number of times of rubbing: 100 round trips Black oil ink was painted on the reverse of the sample finished rubbing, the painted area was visually observed with reflected light, and the scratch on the rubbed area was evaluated according to the following criteria.

A: Scratch cannot be observed even with very careful observation.
AB: Thin scratch can be slightly observed with very careful observation.
B: Thin scratch can be observed.
BC: Moderate scratch can be observed.
C: Scratch can be observed at a glance.
CC: The film surface is entirely scratched.

(Evaluation 3) Evaluation of Adhesion of Marking Ink:

As the criterion of antifouling of the surface, after the antireflection film was humidity conditioned at 25° C., 60% RH for 2 hours, marking ink was adhered on the surface of the sample, and the state of wiping it off with cleaning cloth was observed, and marling ink adhesion was evaluated as follows.

AA: The trace of marking ink can be completely wiped off.
A: The trace of marking ink is seen little.
B: The trace of marking ink is seen a little.
C: The trace of marking ink can be hardly wiped off.

(Evaluation 4) Evaluation of Coating Stability:

The coating solution manufactured in Example 1 was sealed at 30° C., 60% RH and preserved for 1 month, after that an antireflection film was manufactured in the same manner as in Example 1. Black oil ink was painted on the reverse of the sample, the painted area was visually observed with reflected light, and the surface state was evaluated according to the following criteria.

A: Unevenness cannot be observed even with very careful observation.
AB: Faint unevenness can be slightly observed with very careful observation.
B: Faint unevenness can be observed.
BC: Moderate unevenness can be observed.
C: Unevenness can be observed at a glance.

The results of evaluations are shown in Table 5 below. The sample manufactured in evaluation 4 is different from those used in evaluations 1 to 3, but they are manufactured with the same coating solution, and so the result of evaluation is shown in Table 5 together.

TABLE 5

| | | Antireflection Film | | | | | |
|---|---|---|---|---|---|---|---|
| | | Constitution | | Characteristics | | | |
| | | Coating Solution for Hard Coat Layer (No.) | Coating Solution for Low Refractive Index Layer (No.) | Average Reflectance (%) | Scratch Resistance with Eraser | Adhesion of Marking Ink | Stability of Coating Solution (unevenness) |
| Example No. | Sample No. | | | | | | |
| Example 1-1 | 101 | HCL-1 | LLL-1 | 1.86 | AB | AA | A |
| Example 1-2 | 102 | HCL-1 | LLL-2 | 1.83 | A | AA | A |
| Example 1-3 | 103 | HCL-1 | LLL-3 | 1.84 | A | AA | A |

TABLE 5-continued

Antireflection Film

| Example No. | Sample No. | Coating Solution for Hard Coat Layer (No.) | Coating Solution for Low Refractive Index Layer (No.) | Average Reflectance (%) | Scratch Resistance with Eraser | Adhesion of Marking Ink | Stability of Coating Solution (unevenness) |
|---|---|---|---|---|---|---|---|
| Example 1-4 | 104 | HCL-1 | LLL-4 | 1.85 | AB | AA | A |
| Example 1-5 | 105 | HCL-1 | LLL-5 | 1.86 | A | AA | A |
| Example 1-6 | 106 | HCL-1 | LLL-6 | 1.85 | A | AA | A |
| Example 1-7 | 107 | HCL-1 | LLL-7 | 1.82 | A | AA | A |
| Example 1-8 | 108 | HCL-1 | LLL-8 | 1.82 | A | AA | A |
| Example 1-9 | 109 | HCL-1 | LLL-9 | 1.83 | A | AA | A |
| Example 1-10 | 110 | HCL-1 | LLL-10 | 1.84 | A | AA | AB |
| Example 1-11 | 111 | HCL-1 | LLL-11 | 1.83 | A | AA | A |
| Example 1-12 | 112 | HCL-1 | LLL-12 | 1.86 | A | AA | A |
| Example 1-13 | 113 | HCL-1 | LLL-13 | 1.85 | A | AA | A |
| Example 1-14 | 114 | HCL-1 | LLL-14 | 1.84 | A | AA | A |
| Example 1-15 | 115 | HCL-1 | LLL-15 | 1.85 | A | AA | A |
| Example 1-16 | 116 | HCL-1 | LLL-16 | 1.83 | A | AA | A |
| Example 1-17 | 117 | HCL-1 | LLL-17 | 1.84 | A | AA | A |
| Example 1-18 | 118 | HCL-1 | LLL-18 | 1.86 | AB | AA | A |
| Example 1-19 | 119 | HCL-1 | LLL-19 | 1.85 | A | AA | AB |
| Example 1-20 | 120 | HCL-1 | LLL-20 | 1.83 | A | AA | A |
| Example 1-21 | 121 | HCL-1 | LLL-21 | 1.84 | A | AA | A |
| Example 1-22 | 122 | HCL-1 | LLL-22 | 1.94 | AB | AA | A |
| Example 1-23 | 123 | HCL-1 | LLL-23 | 1.84 | A | AA | A |
| Example 1-24 | 124 | HCL-1 | LLL-24 | 1.83 | A | AA | A |
| Example 1-25 | 125 | HCL-1 | LLL-25 | 1.82 | A | AA | A |
| Example 1-26 | 126 | HCL-1 | LLL-26 | 1.83 | A | AA | A |
| Example 1-27 | 127 | HCL-1 | LLL-27 | 1.81 | A | AA | AB |
| Example 1-28 | 128 | HCL-1 | LLL-28 | 1.82 | A | AA | A |
| Example 1-29 | 129 | HCL-1 | LLL-29 | 1.83 | A | AA | A |
| Example 1-30 | 130 | HCL-1 | LLL-30 | 1.83 | A | AA | A |
| Example 1-31 | 131 | HCL-1 | LLL-31 | 1.81 | A | AA | A |
| Example 1-32 | 132 | HCL-1 | LLL-32 | 1.85 | AB | AA | A |
| Example 1-33 | 133 | HCL-1 | LLL-33 | 1.85 | A | AA | A |
| Example 1-34 | 134 | HCL-1 | LLL-34 | 1.83 | A | AA | A |
| Example 1-35 | 135 | HCL-1 | LLL-35 | 1.85 | A | AA | A |
| Example 1-36 | 136 | HCL-1 | LLL-36 | 1.83 | A | AA | AB |
| Comparative Example 1-1 | R01 | HCL-1 | LLRL-1 | 1.84 | A | AA | C |
| Comparative Example 1-2 | R02 | HCL-1 | LLRL-2 | 1.85 | C | Evaluation impossible | A |
| Comparative Example 1-3 | R03 | HCL-1 | LLRL-3 | 1.83 | A | AA | C |
| Comparative Example 1-4 | R04 | HCL-1 | LLRL-4 | 1.83 | C | Evaluation impossible | A |

As can be seen from the results in the examples of the invention, antireflection film samples (101) to (138) in Examples 1-1 to 1-38 in the invention are excellent in scratch resistance and antifouling property. Antireflection film samples (R01) and (R03) in Comparative Examples 1-1 and 1-3 in which an organic base group is not used in the curing catalyst show the equivalent performance in scratch resistance and antifouling property, but inferior in preservation stability of the coating solution and surface state after preservation for a long period of time deteriorated. Antireflection film samples (R02) and (R04) in Comparative Examples 1-2 and 1-4 in which a quaternary ammonium salt of p-toluenesulfonic acid is used are low in curing activity, and films greatly inferior in scratch resistance can only be obtained and the antifouling property could not be evaluated.

From the above results, it can be seen that a coating solution reconciling stability and curing activity can be manufactured by satisfying the requisites of the invention, from which an antireflection film of high quality can be manufactured.

Example 2

Multilayer antireflection films shown below were manufactured.

Manufacture of Hard Coat Layer Coating Solution (HCL-2):

"De Solite Z7404" (a hard coat composition solution containing zirconia fine particles, manufactured by JSR Corporation) (100 mass parts), 31 mass parts of "DPHA" (UV curable resin, manufactured by Nippon Kayaku Co., Ltd.), 10 mass parts of "KBM-5103" (a silane coupling agent, manufactured by Shin-Etsu Chemical Co., Ltd.), 29 mass parts of methyl ethyl ketone (MEK), 13 mass parts of methyl isobutyl ketone (MIBK), and 5 mass parts of cyclohexanone were put in a mixing tank and stirred to prepare hard coat layer coating solution (HCL-2).

Manufacture of Antireflection Film (201):

As a support, a triacetyl cellulose film "TAC-TD80U" (manufactured by Fuji Photo Film Co., Ltd.) was rewound in a rolled up state. The above prepared hard coat layer coating solution (HCL-2) was coated on the film with a micro gravure roll of a diameter of 50 mm and having a gravure pattern of line number 135/inch, a depth of 60 μm, and a doctor blade on the condition of a traveling speed of 10 m/min. After that, the coated layer was dried at 60° C. for 150 seconds, and then cured by irradiation with ultraviolet ray under nitrogen purge, with an air-cooled metal halide lamp of 160 W/cm (manufactured by EYEGRAPHICS, CO., LTD.) at illumination intensity of 400 mW/cm$^2$ and quantity of radiation of 110 mJ/cm$^2$, whereby a hard coat layer formed, and wound. The hard coat layer was formed by the adjustment of the rotation number of the gravure roll to reach the thickness of 4.0 μm of the hard coat layer after curing.

Antireflection film sample (201) was manufactured by coating low refractive index layer coating solution (LLL-1) on the thus-obtained hard coat layer in a thickness of 95 mm. The low refractive index layer was dried at 110° C. for 10 minutes, and the layer was cured by irradiation with ultraviolet ray, while maintaining the atmosphere of oxygen concentration of 0.01 volume % or less by nitrogen purge, with an air-cooled metal halide lamp of 240 W/cm (manufactured by EYEGRAPHICS, CO., LTD.) at illumination intensity of 120 mW/cm$^2$ and quantity of radiation of 240 mJ/cm$^2$.

Manufacture of Antireflection Films (202) to (238):

Antireflection films (202) to (238) were manufactured in the same manner as in the manufacture of antireflection film sample (201), except that any of low refractive index layer coating solutions (LLL-2) to (LLL-38) was used in place of (LLL-1).

As a result of evaluations of antireflection films (201) to (238) according to the procedures in Example 1, the same results were obtained by the use of the low refractive index layers in the invention.

Use of Antireflection Film:

Manufacture of Polarizing Plate Having Antireflection Film:

Example 3

A polarizer was manufactured by adsorbing iodine onto a stretched polyvinyl alcohol film. Subsequently, the antireflection film manufactured in Example 1 that had been subjected to saponification treatment was stuck on one side of the polarizer with a polyvinyl alcohol adhesive in a manner that the support (triacetyl cellulose) side of the antireflection film faced the polarizer. A visible angle-widening film "Wide View Film SA12B" (manufactured by Fuji Photo Film Co., Ltd.) having an optically compensatory layer was subjected to saponification treatment and stuck on another side of the polarizer with a polyvinyl alcohol adhesive. Thus, a polarizing plate was manufactured. As a result of evaluations in the state of polarizing plate according to the procedures in Example 1, the same results were obtained by the use of the low refractive index layer in the invention.

Manufacture of Image Display:

Example 4

When each of the antireflection film samples in Examples 1 and 2, and the polarizing plate sample in Example 3 using the antireflection film in Example 1 was stuck on the glass plate of the surface of an organic EL display with an adhesive, the reflection on the glass surface could be suppressed with every sample, and a display having high visibility could be obtained.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-281584 filed Sep. 28 of 2005, the contents of which are incorporated herein by reference.

The invention claimed is:

1. An antireflection film comprising:
   a transparent support; and
   a low refractive index layer formed by coating a composition on the transparent support, the composition comprising:
   a fluorine-containing polymer comprising a first polymerization unit derived from a fluorine-containing vinyl monomer and a second polymerization unit derived from a hydroxyl group-containing vinyl monomer,
   a crosslinking agent capable of reacting with a hydroxyl group, and
   a salt formed from an acid and an organic base, the organic base having a pKa of a conjugate acid thereof of 5.0 to 13.0.

2. The antireflection film according to claim 1, wherein the pKa is from 5.0 to 11.0.

3. The antireflection film according to claim 1, wherein the acid is a sulfonic acid or a phosphonic acid.

4. The antireflection film according to claim 1, wherein the composition has the salt in a proportion of 0.01 to 10 mass % (weight %) to the fluorine-containing polymer.

5. The antireflection film according to claim 1, wherein the fluorine-containing polymer further comprises a polymerization unit having a graft portion on a side chain thereof, the graft portion containing a polysiloxane repeating unit represented by formula (1), and the fluorine-containing polymer has a main chain consisting of carbon atoms:

Formula (1):

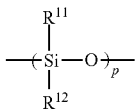

wherein R$^{11}$ and R$^{12}$, which may be the same or different from each other, each represents an alkyl group or an aryl group; and p represents an integer of 5 to 500.

6. The antireflection film according to claim 1, wherein the fluorine-containing polymer further has a main chain comprising a polysiloxane repeating unit represented by formula (1):

Formula (1):

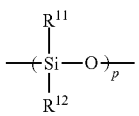

wherein R$^{11}$ and R$^{12}$, which may be the same or different from each other, each represents an alkyl group or an aryl group; and p represents an integer of 5 to 500.

7. The antireflection film according to claim 1, wherein the composition further comprises a compound having a polysiloxane structure, the polysiloxane structure having a hydroxyl group or a functional group capable of forming a bond by reaction with a hydroxyl group.

8. The antireflection film according to claim 1, wherein the crosslinking agent is a compound comprising a nitrogen atom and two or more carbon atoms adjacent to nitrogen atom, each being substituted with an alkoxyl group.

9. A polarizing plate comprising: a polarizer; and two protective films, at least one of the two protective films being an antireflection film according to claim 1.

10. An image display comprising an antireflection film according to claim 1 or a polarizing plate according to claim 9 in an outermost surface of the image display.

* * * * *